(12) United States Patent
Ohta

(10) Patent No.: US 9,201,526 B2
(45) Date of Patent: Dec. 1, 2015

(54) STORAGE MEDIUM HAVING INFORMATION PROCESSING PROGRAM STORED THEREON, INFORMATION PROCESSING DEVICE, INFORMATION PROCESSING SYSTEM, AND ATTITUDE CALCULATION METHOD

(71) Applicant: NINTENDO CO., LTD., Kyoto (JP)

(72) Inventor: Keizo Ohta, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 566 days.

(21) Appl. No.: 13/664,804

(22) Filed: Oct. 31, 2012

(65) Prior Publication Data

US 2014/0025332 A1   Jan. 23, 2014

(30) Foreign Application Priority Data

Jul. 20, 2012   (JP) ................... 2012-161663

(51) Int. Cl.
| | | |
|---|---|---|
| G01B 7/00 | (2006.01) | |
| A63F 13/21 | (2014.01) | |
| G06F 17/40 | (2006.01) | |
| G06F 19/00 | (2011.01) | |
| G06F 3/038 | (2013.01) | |
| G06F 3/0346 | (2013.01) | |
| A63F 13/428 | (2014.01) | |
| A63F 13/217 | (2014.01) | |

(52) U.S. Cl.
CPC .............. *G06F 3/038* (2013.01); *A63F 13/217* (2014.09); *A63F 13/428* (2014.09); *G01B 7/00* (2013.01); *G06F 3/0346* (2013.01); *A63F 13/21* (2014.09); *G06F 17/40* (2013.01); *G06F 19/00* (2013.01)

(58) Field of Classification Search
None
See application file for complete search history.

(56) References Cited

U.S. PATENT DOCUMENTS

| | | | | | |
|---|---|---|---|---|---|
| 6,928,366 | B2* | 8/2005 | Ockerse | ................. | G01C 17/38 33/356 |
| 6,968,273 | B2* | 11/2005 | Ockerse | ................. | G01C 17/38 701/530 |
| 7,149,627 | B2* | 12/2006 | Ockerse | ................. | G01C 17/28 701/530 |
| 7,266,452 | B2* | 9/2007 | Ockerse | ................. | G01C 17/28 701/530 |
| 7,379,814 | B2* | 5/2008 | Ockerse | ................. | G01C 17/28 33/361 |
| 2003/0167121 | A1* | 9/2003 | Ockerse | ................. | G01C 17/38 701/530 |
| 2004/0236510 | A1* | 11/2004 | Ockerse | ................. | G01C 17/38 701/530 |
| 2004/0254727 | A1* | 12/2004 | Ockerse | ................. | G01C 17/28 701/535 |
| 2007/0124076 | A1* | 5/2007 | Ockerse | ................. | G01C 17/28 701/530 |

(Continued)

FOREIGN PATENT DOCUMENTS

JP    2012-095808    5/2012

*Primary Examiner* — Edward Cosimano
(74) *Attorney, Agent, or Firm* — Nixon & Vanderhye P.C.

(57) ABSTRACT

An example information processing device calculates an attitude of an input unit having a magnetic sensor. The information processing device repeatedly obtains detected magnetic vectors detected by the magnetic sensor. The information processing device repeatedly estimates a center position of a spherical body having a curved surface which is estimated based on end point positions of the detected magnetic vectors. The attitude of the input unit is calculated based on a direction vector representing a direction from the center position to the end point position of the detected magnetic vector. Each time a detected magnetic vector is obtained, the information processing device updates the center position so that at least some of lengths from the center position to end points of the detected magnetic vectors used for the estimation of the center position are brought closer to an average between the lengths.

14 Claims, 14 Drawing Sheets

(56) References Cited

U.S. PATENT DOCUMENTS

| | | | |
|---|---|---|---|
| 2007/0288166 A1* | 12/2007 | Ockerse | G01C 17/28 701/530 |
| 2012/0088580 A1 | 4/2012 | Takeda et al. | |
| 2014/0025329 A1* | 1/2014 | Ohta | G06F 3/038 702/94 |
| 2014/0025335 A1* | 1/2014 | Ohta | A63F 13/02 702/154 |

* cited by examiner

| CLASSIFICATION VECTOR | DETECTED MAGNETIC VECTOR |
|---|---|
| Vc1 | |
| Vc2 | |
| ⋮ | ⋮ |
| Vc11 | Vdx |
| ⋮ | ⋮ |
| Vc16 | |

STORAGE MEDIUM HAVING INFORMATION PROCESSING PROGRAM STORED THEREON, INFORMATION PROCESSING DEVICE, INFORMATION PROCESSING SYSTEM, AND ATTITUDE CALCULATION METHOD

CROSS REFERENCE TO RELATED APPLICATION

The disclosure of Japanese Patent Application Nos. 2012-161662, 2012-161663 and 2012-161664 filed on Jul. 20, 2012 is incorporated herein by reference.

FIELD

The technology herein relates to a storage medium having information processing program stored thereon, an information processing device, an information processing system and an attitude calculation method for calculating an attitude of an input unit.

BACKGROUND AND SUMMARY

There are conventional techniques for calculating the attitude of a device using a magnetic sensor. For example, by detecting the direction of a magnetic field using a magnetic sensor, it is possible to calculate the attitude of a device with respect to the direction of the magnetic field.

Where an attitude is calculated using a sensor, the ability to precisely calculate the attitude is required.

Thus, the present disclosure provides a storage medium having information processing program stored thereon, an information processing device, an information processing system, and an attitude calculation method capable of precisely calculating the attitude of a device.

(1)

This application describes a non-transitory computer-readable storage medium storing an information processing program to be executed by a computer of an information processing device for calculating an attitude of an input unit having a magnetic sensor. The information processing program causes the computer to execute the following.

The computer repeatedly obtains detected magnetic vectors detected by the magnetic sensor. The computer repeatedly estimates a center position of a spherical body having a curved surface which is estimated based on end point positions of the detected magnetic vectors. The computer calculates the attitude of the input unit based on a direction vector representing a direction from the center position to the end point position of the detected magnetic vector.

Each time a detected magnetic vector is obtained, the computer updates the center position so that at least some of lengths from the center position to end points of the detected magnetic vectors used for the estimation of the center position are brought closer to an average between the lengths.

With configuration (1) above, each time a detected magnetic vector is obtained, the center position is updated so that the lengths come close to being an equal length, and it is therefore possible to calculate an accurate center position based on the latest detected magnetic vector. Thus, it is possible to more precisely calculate the attitude of the input unit. Since the center position is updated each time a detected magnetic vector is obtained, it is possible to start the calculation of the center position even before obtaining a sufficiently large number of detected magnetic vectors, and it is possible to start the attitude calculation early.

(2)

In response to a predetermined condition satisfied by the detected magnetic vectors, the computer may estimate the center position based on the detected magnetic vectors.

With configuration (2) above, since the center position is estimated in response to satisfaction of a predetermined condition, it is possible to reduce the possibility that a center position is obtained that is so inaccurate that it cannot be used in the attitude calculation, and it is possible to more precisely calculate the attitude.

(3)

The predetermined condition may be that an area determined based on the end point positions of the detected magnetic vectors has become larger than a predetermined size.

With configuration (3) above, the center position is calculated when an area determined based on the end point positions of the detected magnetic vectors has become larger than a predetermined size. Therefore, it is possible to precisely calculate the center position, and it is thus possible to more precisely calculate the attitude.

(4)

The predetermined condition may be that directions of the detected magnetic vectors have been spread wider than a predetermined range.

With configuration (4) above, the center position is calculated when the directions of the detected magnetic vectors have been spread wider than a predetermined range. Therefore, it is possible to precisely calculate the center position, and it is thus possible to more precisely calculate the attitude.

(5)

In response to the predetermined condition, the computer may set an initial center position at a position on an inner side of the curved surface which is estimated based on the end point positions of the detected magnetic vectors.

With configuration (5) above, the initial center position is set at a position on the inner side of the curved surface. Thus, by updating the center position thereafter, the center position can be more reliably converged to an accurate position.

(6)

The computer may set an initial center position inside an area determined so as to include the end point positions of the detected magnetic vectors.

With configuration (6) above, the initial center position is set inside an area determined so as to include the end point positions of the detected magnetic vectors. Thus, by updating the center position thereafter, the center position can be brought gradually closer to the actual center position of the spherical body. With the configuration above, it is possible to reduce the possibility that the center position is set at a position so off that it is difficult to be brought closer to the actual center of the spherical body through updates, and it is possible to precisely estimate the center position.

(7)

The computer may set an initial center position inside a rectangular parallelepiped of a smallest size that includes the end point positions of the detected magnetic vectors.

With configuration (7) above, it is possible to easily set to initial center position inside the area determined so as to include the end point positions of the detected magnetic vectors.

(8)

The computer may set an initial center position at a centroid position among the end point positions of the detected magnetic vectors.

With configuration (8) above, the initial center position can be reliably set at a position on the inner side of the curved surface.

(9)

The computer may calculate the attitude of the input unit based on the direction vector at least on a condition that the predetermined condition is satisfied.

With configuration (9) above, it is possible to reduce the possibility that an inaccurate attitude is obtained using an inaccurate center position, and it is possible to more precisely calculate the attitude.

(10)

The computer may calculate the attitude while relatively decreasing an influence of a newly-obtained detected magnetic vector as an amount of change of the center position before and after an update is larger.

With configuration (10) above, the influence of the newly-obtained detected magnetic vector on the attitude calculation is decreased when the amount of change (the amount of movement) of the center position is large. Now, if the amount of change of the center position is large, it is believed that there is a possibility that the center position is inaccurate. Therefore, with configuration (10) above, it is possible to reduce the possibility that an inaccurate attitude is obtained using a center position that is possibly inaccurate, and it is therefore possible to precisely calculate the attitude.

(11)

The computer may calculate the attitude while relatively decreasing an influence of a newly-obtained detected magnetic vector as dispersion between lengths from a current center position to the end point positions of the detected magnetic vectors used for the estimation of the center position is larger.

With configuration (11) above, when the dispersion is large, the influence of a newly-obtained detected magnetic vector on the attitude calculation is small. Now, when the dispersion is large, it is believed that there is a possibility that the center position is inaccurate. Therefore, with configuration (11) above, it is possible to reduce the possibility that an inaccurate attitude is obtained using a center position that is possibly inaccurate, and it is therefore possible to precisely calculate the attitude.

Note that the present specification discloses an information processing device and an information processing system including various units that are equivalent to various units implemented by executing the information processing program recited in configurations (1) to (11) above. The present specification also discloses an attitude calculation method to be carried out in configurations (1) to (11).

With the storage medium having information processing program stored thereon, the information processing device, the information processing system and the attitude calculation method, the center position is updated each time a detected magnetic vector is obtained, whereby it is possible to more precisely calculate the attitude of the input unit.

These and other objects, features, aspects and advantages will become more apparent from the following detailed description when taken in conjunction with the accompanying drawings.

DETAILED DESCRIPTION OF NON-LIMITING EXAMPLE EMBODIMENTS

[1. Configuration of Information Processing System]

Figure 1:
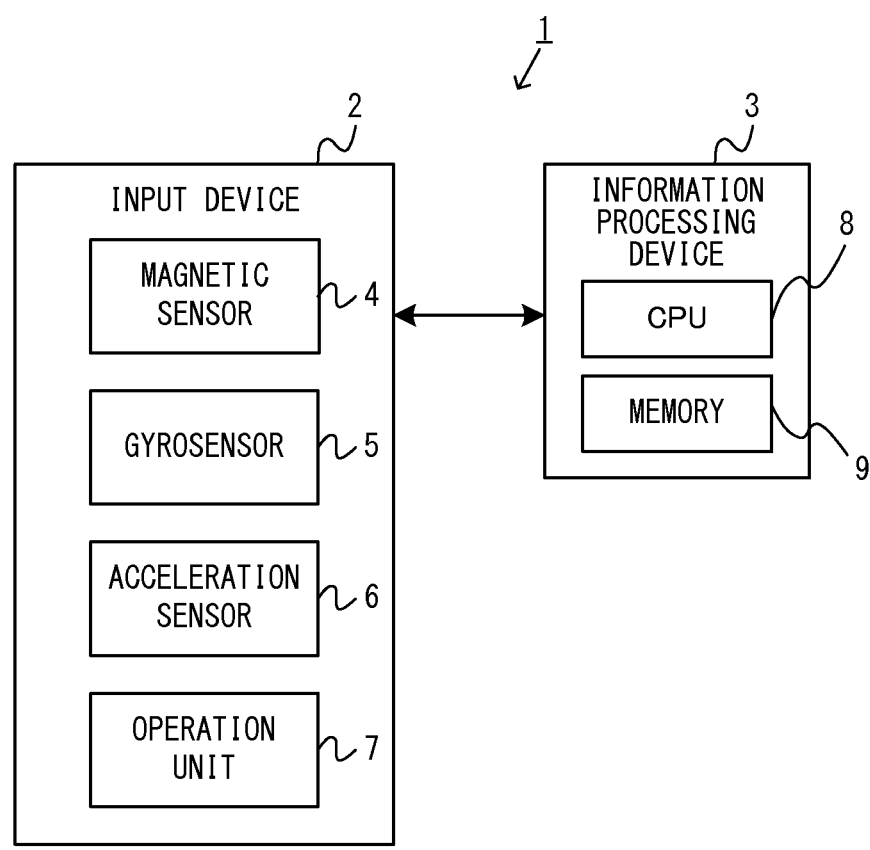
FIG. 1 is a block diagram showing an example non-limiting information processing system of the present embodiment.

An information processing system, an information processing device, an information processing program, and an attitude calculation method according to an example embodiment will now be described. FIG. 1 is a block diagram showing an example non-limiting information processing system. In FIG. 1, an information processing system 1 includes the input device 2 and an information processing device 3. The information processing system 1 of the present embodiment calculates the attitude of the input device 2 using a sensor (a magnetic sensor, etc.) for detecting a value that is dependent on the attitude of the input device 2.

The information processing system 1 includes the input device 2. The input device 2 is portable and in other words is a device that can be held by a user. The input device 2 is capable of communicating with the information processing device 3. The input device 2 transmits operation data, which represents an operation performed on the input device 2, to the information processing device 3. The communication between the input device 2 and the information processing device 3 may be either wireless communication or wired communication.

The input device 2 includes a magnetic sensor 4. The magnetic sensor 4 detects the size and the direction of a magnetic field. Herein, a vector representing the size and the direction of the magnetic field detected by the magnetic sensor 4 will be referred to as the "detected magnetic vector". The input device 2 transmits data, which represents the detected magnetic vector, to the information processing device 3 as the operation data. While the magnetic sensor 4 detects the size and the direction of a magnetic field in three-dimensional values in the present embodiment, it may detect the size and the direction of a magnetic field in values of two or more dimensions. In the present specification, a method for calculating the attitude based on the detection result of the magnetic sensor 4 will be described in detail.

The input device 2 includes a gyrosensor 5. The gyrosensor 5 detects the angular velocity for rotation about each of predetermined axes of the input device 2 (while three axes are used in the present embodiment, the number of axes may be one or more). The input device 2 also includes an acceleration sensor 6. The acceleration sensor 6 detects the acceleration about each of predetermined axes of the input device 2 (while three axes are used in the present embodiment, the number of axes may be one or more). The input device 2 transmits data, which have been detected by the gyrosensor 5 and the acceleration sensor 6, to the information processing device 3 as the operation data. The gyrosensor 5 and the acceleration sensor 6 are used for calculating the attitude of the input device 2. That is, in the present embodiment, the information processing system 1 is capable of calculating the attitude of the input device 2 by a different method other than the method of using the magnetic sensor 4. Note that in other embodiments, the information processing system 1 does not need to include a mechanism (the gyrosensor 5 and the acceleration sensor 6) for calculating the attitude by the different method. The different method may be any method. For example, the information processing system 1 can calculate the attitude of the input device 2 based on an image captured by a camera that is capable of capturing the image of the input device 2 or a camera provided on the input device 2.

The input device 2 includes an operation unit 7. The operation unit 7 may be any control device such as a button (key), a stick, and a touch panel. The input device 2 transmits data, which represents an operation performed on the operation unit 7, to the information processing device 3 as the operation data.

Note that the input device 2 may employ any configuration including a sensor capable of outputting a value that is dependent on the attitude of the input device 2. For example, in other embodiments, some of the components shown in FIG. 1 may be absent, or components other than those described above may be present.

The information processing system 1 includes the information processing device 3. The information processing device 3 receives the operation data (data of the detected magnetic vector) transmitted from the input device 2, and calculates the attitude of the input device 2 based on the data. In the present embodiment, the information processing device 3 performs a predetermined information process using the calculated attitude as an input. The predetermined information process may be any process, and it may be, for example, a game process (a process of controlling the action of a game object arranged in a virtual space in accordance with the attitude). The information processing device 3 may produce an image by the information process, and display the produced image on the display device. The display device may be provided separately from the input device 2 and the information processing device 3, or may be a display section provided on the information processing device 3 or the input device 2.

In the present embodiment, the information processing device 3 includes a CPU (control unit) 8 and a memory 9, and various functions (information processes shown in FIGS. 14 to 16) of the information processing device 3 are implemented by the CPU 8 executing a predetermined information processing program using the memory 9. Note that the information processing device 3 may have any configuration capable of executing the process of calculating the attitude of the input device 2.

Note that in other embodiments, the information processing system 1 may be formed by a single device. That is, the input device (input unit) 2 and the information processing device 3 may be provided as an integral device. For example, the information processing system 1 may be a portable terminal such as a smart phone, a portable game device, etc.

[2. Method of Attitude Calculation]

A method for calculating the attitude of the input device 2 based on the detection result obtained by the magnetic sensor 4 will now be described. In the present embodiment, the information processing system 1 (the information processing device 3) calculates the attitude based on the detected magnetic vector detected by the magnetic sensor 4. Herein, a magnetic field detected by the magnetic sensor 4 can be divided into a component of which the direction of the magnetic field is not dependent on the attitude of the input device 2, and another component of which the direction of the magnetic field is dependent on the attitude of the input device 2. The component of which the direction of the magnetic field is not dependent on the attitude of the input device 2 is a magnetic field generated by the input device 2 itself (the magnetic field of the input device 2), for example. For this component, the direction detected by the magnetic sensor 4 does not change even if the attitude of the input device 2 changes.

On the other hand, the component of which the direction of the magnetic field is dependent on the attitude of the input device 2 is a component of a magnetic field being produced in the space around the input device 2, such as the geomagnetism, for example. For this component, the direction detected by the magnetic sensor 4 changes as the attitude of the input device 2 changes. Thus, the information processing device 3 calculates the attitude of the input device 2 by calculating (estimating), from the detected magnetic vector, the component which is dependent on the attitude of the input device 2. Hereinafter, a vector which is calculated from the detected magnetic vector and represents the component dependent on the attitude of the input device 2, i.e., a vector representing the direction dependent on the attitude, will be referred to as a "direction vector".

Figure 2:
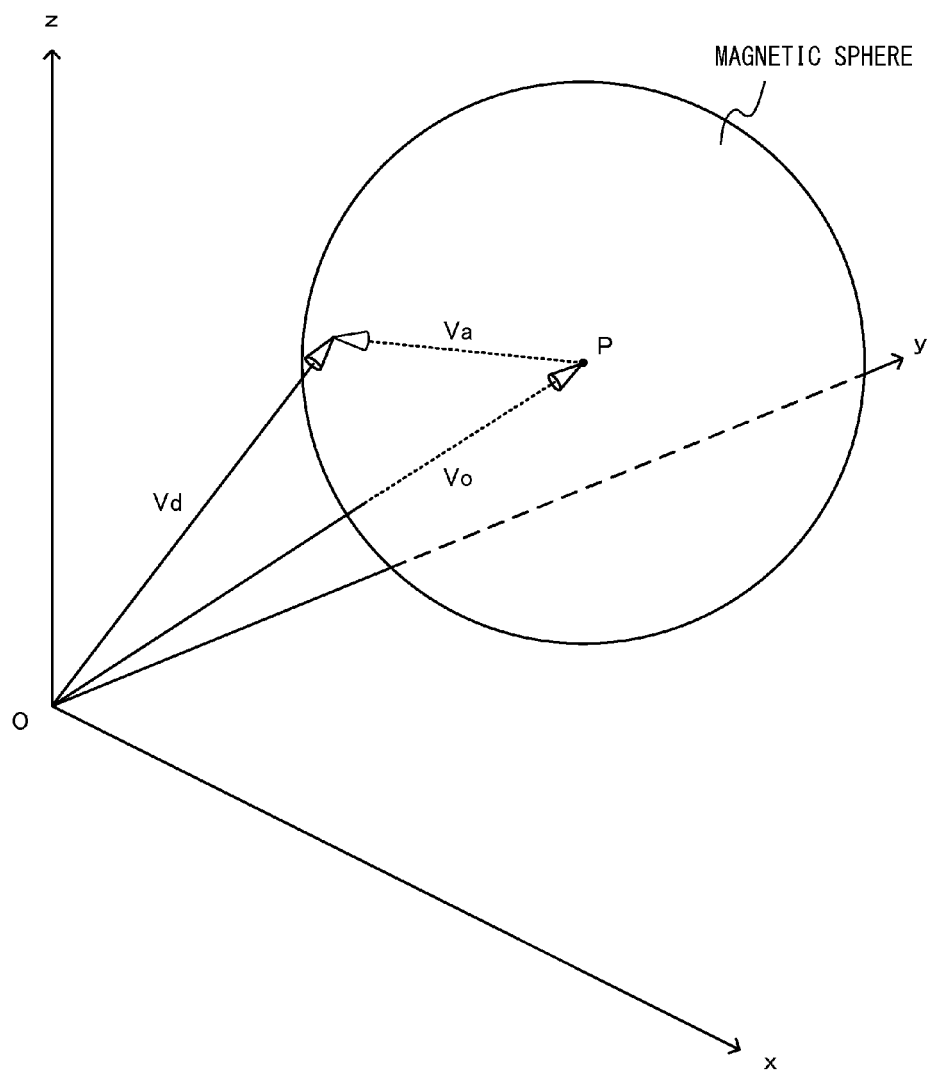
FIG. 2 is a diagram showing an example of a detected magnetic vector and a direction vector.

FIG. 2 is a diagram showing an example of a detected magnetic vector and a direction vector. Note that FIG. 2 shows vectors in an xyz coordinate system of which the origin is the start point of the detected magnetic vector Vd. The magnitude and the direction of the detected magnetic vector Vd change in response to changes in the attitude of the input device 2. If the attitude of the input device 2 is changed so that the input device 2 will point in every direction, the end point (tip) of the detected magnetic vector Vd will trace a spherical surface as shown in FIG. 2. While the spherical body is ideally spherical, it may not be strictly spherical, and may be slightly deformed (elliptical sphere) (that is, the magnitude of the direction vector slightly varies depending on the attitude of the input device 2). Hereinafter, the spherical body will be refereed to as a "magnetic sphere".

Herein, the detected magnetic vector Vd can be divided into a vector Vo and a vector Va. The vector Vo is a vector of which the start point is the origin (the start point of the detected magnetic vector Vd) and of which the end point is the center position P of the magnetic sphere. The vector Vo represents the component not dependent on the attitude of the input device 2. On the other hand, the vector Va is a vector of which the start point is the center position P and of which the end point is the end point of the detected magnetic vector Vd. The vector Va is a vector representing the component dependent on the attitude of the input device 2, i.e., the direction vector.

As described above, the attitude of the input device 2 can be calculated by estimating the center position P of the magnetic sphere, and calculating the direction vector Va based on the center position P. That is, the information processing system 1 (the information processing device 3) obtains detected magnetic vectors Vd detected by the magnetic sensor 4. Then, the information processing system 1 estimates the center position P of a spherical body (magnetic sphere) that has a curved surface that is estimated from the end point positions of the detected magnetic vectors Vd. The attitude of the input device 2 is further calculated based on the direction vector Va, which represents the direction from the center position P to the end point position of the detected magnetic vector Vd. Now, the attitude calculating process for calculating the attitude of the input device 2 will be described in greater detail.

[3. Attitude Calculating Process]

(3-1: Flow of Attitude Calculating Process)

In the present embodiment, the information processing device 3 executes the first to third processes as follows in the attitude calculating process.

First process: a process of repeatedly obtaining detected magnetic vectors, and estimating the center position (initial center position) of the magnetic sphere when a plurality of detected magnetic vectors obtained satisfy a predetermined condition.

Second process: a process of updating the center position based on detected magnetic vectors obtained after the initial center position is estimated.

Third process: a process of calculating the attitude of the input device 2 using a direction vector that is determined based on the center position after the initial center position is calculated.

While the attitude calculating process may be started at any point in time, it is started in the present embodiment in response to a user performing a predetermined operation. When the attitude calculating process is started, first, the first process is executed. In the first process, the information processing device 3 repeatedly obtains detected magnetic vectors from the input device 2. When a plurality of detected magnetic vectors obtained satisfy a predetermined condition, the information processing device 3 estimates the initial center position based on the plurality of detected magnetic vectors. Note that the initial center position refers to a center position that is estimated (calculated) first in the attitude calculating process.

When the center position is calculated by the first process, the second process and the third process are executed. In the second process, each time another detected magnetic vector is obtained, the information processing device 3 updates the center position in view of the newly-obtained detected magnetic vector. Thus, it is possible to correct the center position to a more accurate position, thereby allowing for precise calculation of the attitude of the input device 2.

In the third process, it is possible to calculate the direction vector from the detected magnetic vector using the center position. In the present embodiment, when a predetermined condition is satisfied, the information processing device 3 calculates a direction vector corresponding to the newly-obtained detected magnetic vector, and calculates the attitude of the input device 2 using the calculated direction vector.

Note that the second process and the third process are executed in parallel. That is, after the center position is calculated, the second process and the third process are executed alternately. Therefore, after the center position is calculated, the process of obtaining the detected magnetic vector, the process of updating the center position, and the process of calculating the attitude based on the direction vector are repeatedly executed.

The first to third processes will now be described in detail. Note that the figures used in the following description use a two-dimensional plane for easy understanding of the figures. Note however that in the present embodiment, calculations using three-dimensional vectors, positions, etc., in a three-dimensional space are performed in practice. Note that in other embodiments, the first to third processes may be executed using two-dimensional vectors, positions, etc., in a two-dimensional plane so as to calculate the attitude of the input device 2 in a two-dimensional plane.

(3-2: First Process)

In the first process, the information processing device 3 repeatedly obtains detected magnetic vectors. The detected magnetic vectors obtained are stored in a buffer provided in a storage unit that is accessible by the information processing device 3. In the present embodiment, the maximum number of detected magnetic vectors stored in the buffer is limited, and detected magnetic vectors that are determined unnecessary are deleted from the buffer while leaving those satisfying a predetermined condition in the buffer, the details of which will be described later. Then, the detected magnetic vectors stored in the buffer are used for the estimation (calculation) of the center position. Note that the accurate center position of the magnetic sphere will be hereinafter referred to as the "actual center position", distinguished from the center position estimated (calculated) by the information processing device 3.

(Determination on Whether or not to Calculate Initial Center Position)

In the first process, the information processing device 3 determines whether or not to calculate the initial center position each time a detected magnetic vector is obtained. That is, each time a detected magnetic vector is obtained, the information processing device 3 determines whether detected magnetic vectors that have been obtained thus far satisfy a predetermined condition. Then, when the predetermined condition is satisfied, the first center position (initial center position) is estimated (calculated). The predetermined condition is a condition used for determining whether sufficient detected magnetic vectors for estimating the center position have been obtained. According to the present embodiment, since the center position is estimated in response to satisfaction of the predetermined condition, it is possible to reduce the possibility of obtaining such an inaccurate center position that it cannot be used for the calculation of the attitude, and it is therefore possible to more accurately calculate the attitude.

Note however that the attitude calculating process in the present embodiment does not require a very large number of detected magnetic vectors for estimating the center position. With the attitude calculating process of the present embodiment, it is possible to estimate the center position when detected magnetic vectors that account for a portion of the spherical surface of the magnetic sphere are obtained, the details of which will be described later. That is, in the present embodiment, it is not necessary to point the input device 2 in various directions for the estimation of the center position, but the center position can be estimated with the input device 2 pointing substantially in one direction. Note that for the estimation of the center position, one possible way may be to have the user move the input device 2 in a figure eight motion, for example, so as to obtain detected magnetic vectors of various directions. In the present embodiment, it is possible to estimate the center position without having the user perform such an operation (such an operation may be performed by the user for the purpose of, for example, estimating the center position more precisely).

In the present embodiment, the information processing device 3 calculates the initial center position on the condition that an area that is determined so as to include end point positions of a plurality of detected magnetic vectors has reached a predetermined size. Specifically, the information processing device 3 sets a recorded range based on the detected magnetic vectors, and determines whether the recorded range which has been set has reached a predetermined size. Now, referring to FIG. 3, the determination on whether or not to calculate the initial center position will be described in detail.

Figure 3:
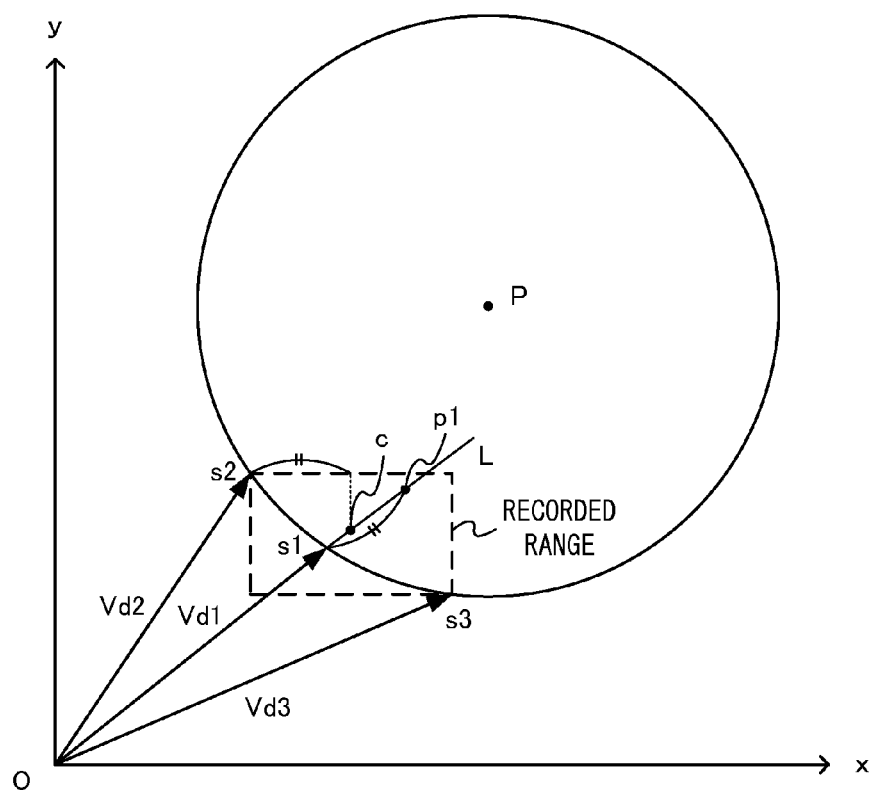
FIG. 3 is a diagram showing an example of an initial center position which has been set.

FIG. 3 is a diagram showing an example of the initial center position which has been set. The information processing device 3 sets a recorded range each time a detected magnetic vector is obtained (see FIG. 3). The recorded range is set so as to include end points of the detected magnetic vectors stored in the buffer. In the present embodiment, the recorded range is set as a rectangular parallelepiped of the smallest size that includes the end points therein. More specifically, the recorded range is set as a rectangular parallelepiped composed of planes each parallel to a plane (the xy plane, the yz plane, or the xz plane) containing two axes of the three-dimensional coordinate system (xyz coordinate system) used for representing the detected magnetic vectors. Note that the recorded range may be any area that is determined based on the detected magnetic vectors (the end point positions of the detected magnetic vectors). For example, the shape of the recorded range is not limited to rectangular parallelepiped, but may be any shape including sphere.

When the recorded range is set, the information processing device 3 determines whether the recorded range has become larger than the predetermined size. Specifically, the information processing device 3 determines whether any one edge of the rectangular parallelepiped, which is the recorded range, has become longer than a predetermined length. Note that the predetermined length is shorter than the diameter of the smallest magnetic sphere with which the attitude calculation is expected to be possible, and is set, for example, to be about a half of one edge of a polyhedron shown in FIG. 12 (sufficiently shorter than the diameter thereof), the details of which will be described later. Thus, in the present embodiment, the calculation of the center position can be started without significantly changing the attitude of the input device 2.

If it is determined in the determination process that the recorded range has become larger than a predetermined size, the initial center position is calculated. Note that the determination process may be performed by any determination method capable of determining the size of the recorded range. For example, the information processing device 3 may determine whether the volume of the recorded range has become larger than a predetermined volume.

As described above, in the present embodiment, the initial center position is calculated on the condition that an area (recorded range) that is determined so as to include the end point positions of a plurality of detected magnetic vectors used for the calculation of the center position has become larger than a predetermined size. Note that in other embodiments, the information processing device 3 may calculate the initial center position on the condition that the various directions of the plurality of detected magnetic vectors have been spread wider than a predetermined range. For example, the initial center position may be calculated on the condition that a solid angle that is determined so as to include all the directions of the plurality of detected magnetic vectors has become greater than a predetermined angle.

(Method for Calculating Initial Center Position)

The initial center position is calculated based on a plurality of detected magnetic vectors stored in the buffer. In the present embodiment, the initial center position is set inside an area (herein, the recorded range) that is determined so as to include the end point positions of the plurality of detected magnetic vector. In other words, the initial center position is set inside the rectangular parallelepiped, which is the recorded range. Then, the initial center position is set around the end points of the plurality of detected magnetic vectors, and can be gradually brought closer to the center of the magnetic sphere through the center position updating process (the second process) to be described later. That is, it is possible to set the initial center position at an appropriate position, reducing the possibility that the initial center position is set at a position that is significantly off (such that it is difficult to be brought closer to the center of the magnetic sphere through the updating process).

As shown in FIG. 3, the initial center position p1 is set at a position p1 that lies at a predetermined distance away from the end point s1 of the reference magnetic vector, among the detected magnetic vectors (Vd1 to Vd3) stored in the buffer, along a straight line L extending from the end point s1 toward the center c of the recorded range. The reference magnetic vector may be determined in any manner. In the present embodiment, the reference magnetic vector is a detected magnetic vector Vd1 that is the first vector obtained. Note that in other embodiments, one of the detected magnetic vectors that is extending from the origin toward a direction closest to the center c of the recorded range may be selected as the reference magnetic vector.

By setting the initial center position along the straight line L extending from the position s1, which is the end point of the reference magnetic vector, toward the center c of the recorded range, as described above, the initial center position p1 will be set at a position on the inner side of a curved surface (the arc s2s3 in FIG. 3) estimated from the end points s1 to s3 of the detected magnetic vectors. Note that if the initial center position is set at a position on the outer side of the curved surface, the center position will be moved further away on the outer side through the center position updating process (the second process) to be described later, and there is a possibility that it will not properly converge on the actual center position P of the magnetic sphere. In contrast, by setting the initial center position at a position that is on the inner side of the curved surface, the center position will more reliably converge (it is possible to reduce the possibility that it erroneously converges on the outer side).

While the predetermined distance may be determined in any manner, it is set to a length that is half the length of the longest side of the recorded range in the present embodiment (see FIG. 3). Thus, the initial center position p1 can be reliably inside the recorded range. By setting the predetermined distance to a length that is half the longest side, it is possible to set the initial center position at a position that is more on the inner side of the curved surface estimated from the end points of the detected magnetic vectors. Thus, since the initial center position p1 can be set at a position that is closer to (or, more likely to be) the actual center position P of the magnetic sphere, the center position is more likely to converge to the actual center position P. Note that in other embodiments, the initial center position may be set at another position along the straight line L, e.g., the intersection between the straight line L and a plane of the recorded range.

Note that in other embodiments, the information processing device 3 may set the initial center position at the centroid position among the end points of the detected magnetic vectors. In other embodiments, the centroid position may be used instead of the position at the center of the recorded range. Also in these manners, it is possible to set the initial center position inside an area (recorded range) that is determined so as to include the end point positions of the detected magnetic vectors, and it is possible to set the initial center position at a position that is on the inner side of the curved surface.

In other embodiments, the information processing device 3 may employ a method for calculating (estimating) a position that is equidistance from the end points of the detected magnetic vectors, i.e., the actual center position P. Note that according to the present embodiment, it is possible to easily and quickly calculate the initial center position.

(3-3: Second Process)

After the initial center position is set as described above, the information processing device 3 successively updates the center position. That is, each time a detected magnetic vector is obtained, a new center position is calculated based on the obtained detected magnetic vector. In the present embodiment, the information processing device 3 calculates the (updated) center position using a condition regarding the length of a line segment (radius) from the center position to the end point position of the detected magnetic vector. Specifically, when a detected magnetic vector is newly obtained, the information processing device 3 updates the center position so that the lengths of the radii from the center position to the end points of the detected magnetic vectors (used for the estimation of the center position) are each brought closer to the average length between these radii. Now, referring to FIG. 4, the details of the center position updating process will be described.

Figure 4:
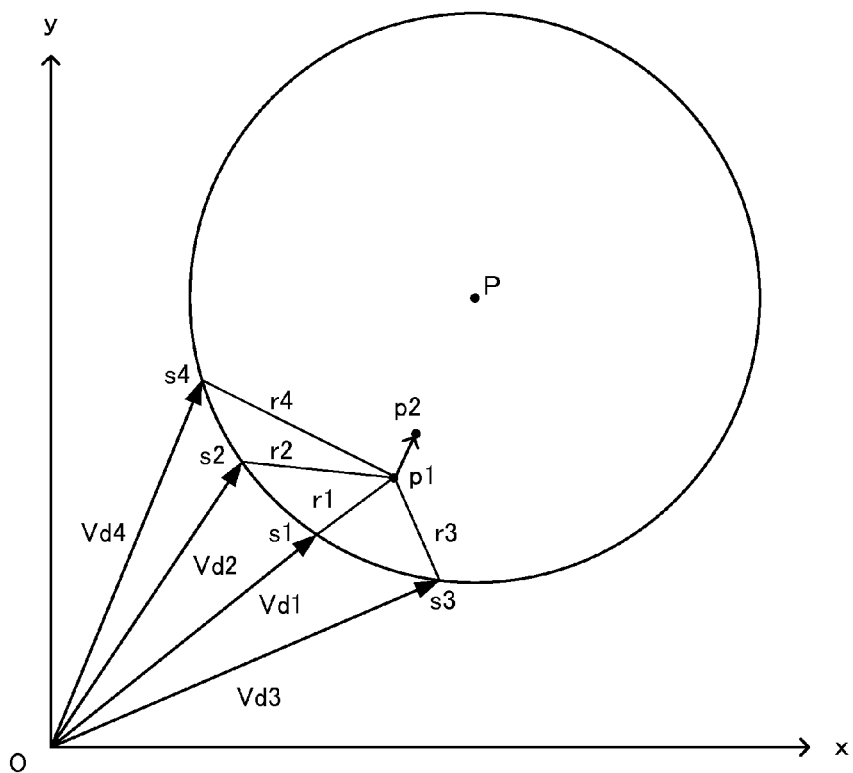
FIG. 4 is a diagram showing an example of the center position before and after it is updated in an updating process.

FIG. 4 is a diagram showing an example of the center position before and after it is updated in an updating process. FIG. 4 shows a case where a new detected magnetic vector Vd4 is obtained after the initial center position p1 shown in FIG. 3 is set. In this case, the information processing device 3 calculates the length of each of line segments r1 to r4 extending from the current center position p1 to the end points of the detected magnetic vectors (Vd1 to Vd4). Note that a line segment from the center position to the end point of a detected magnetic vector can be said to be the radius of the magnetic sphere. Therefore, in the present specification, the line segment may be referred to also as the "radius". Note that where the estimated center position does not coincide with the actual center position, the "radii" from the estimated center position to the end point positions of a plurality of detected magnetic vectors may not be of the same length. The information processing device 3 also calculates the average value between the line segments (the average radius).

Figure 5:
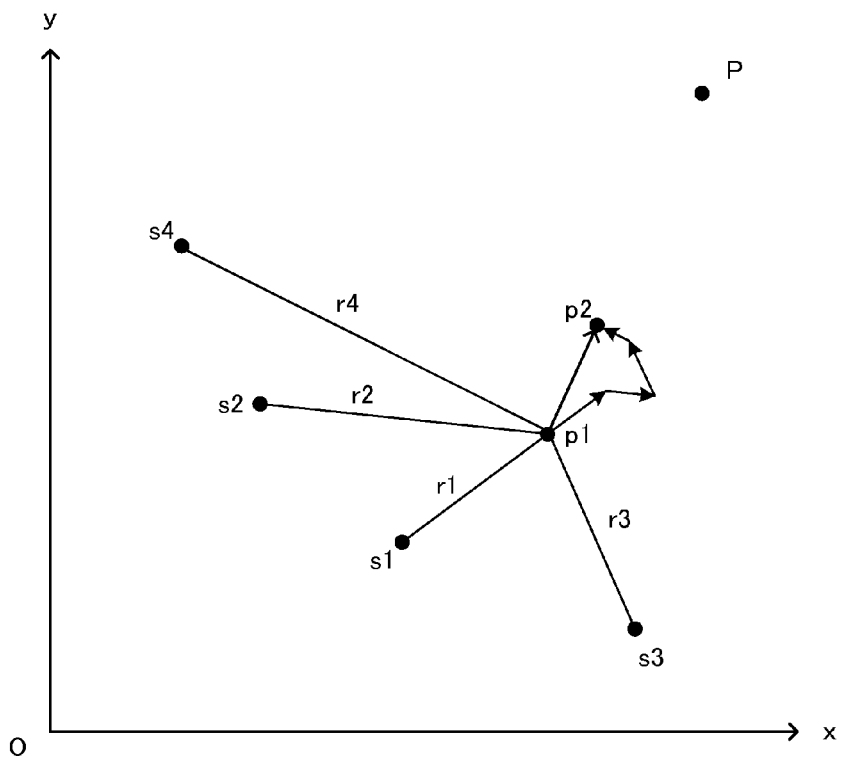
FIG. 5 is a diagram showing, on an enlarged scale, a portion of the area shown in FIG. 4.

The information processing device 3 updates the center position p1 so that the length of each of the radii r1 to r4 is brought closer to the average radius. Specifically, for each detected magnetic vector, the information processing device 3 changes the length of the radius by a predetermined proportion of the difference between the radius and the average radius (e.g., 20% of the difference). In other words, this process is a process of moving the center position in the direction of the radius so that the length of the radius is changed. FIG. 5 is a diagram showing, on an enlarged scale, a portion of the area shown in FIG. 4. In the example shown in FIGS. 4 and 5, the center position p1 moves in a direction parallel to the radius r1 through the process of changing the radius r1. Note that in this example, since the average radius is greater than the radius r1, the center position p1 moves in such a direction that the radius r1 increases (see arrows shown in FIG. 5). Similarly, the center position p1 moves in a direction parallel to the radius r2 through the process of changing the radius r2, the center position p1 moves in a direction parallel to the radius r3 through the process of changing the radius r3, and the center position p1 moves in a direction parallel to the radius r4 through the process of changing the radius r4 (see arrows shown in FIG. 5). As a result of the process of changing the lengths of the radii r1 to r4, the center position p1 moves to the center position p2.

As described above, through the center position updating process, the radii come closer to the average radius, i.e., the radii are changed so as to come closer to being an equal radius. That is, the center position is updated so as to come closer to the actual center position P of the magnetic sphere (see FIG. 5). Therefore, by the updating process, it is possible to more precisely calculate the center position, and to more accurately calculate the attitude of the input device 2. Note that in the present embodiment, the initial center position is set around the end points of detected magnetic vectors (inside the recorded range). Therefore, in the present embodiment, the initial center position is set (more likely set) on the side closer to the end points than to the actual center position P. Therefore, it can be said that the updating process is a process of moving the center position away from the end points.

Note that in the present embodiment, the information processing device 3 executes, as a single iteration of the updating process, a process of moving the center position a number of times in accordance with the number of detected magnetic vectors. Since this process is not a process of repeatedly moving the center position until the radii become equal to the average radius, the information processing device 3 can quickly execute a single iteration of the updating process.

Note that in other embodiments, in a single iteration of the updating process, the center position may be moved for some of the plurality of detected magnetic vectors stored in the buffer. That is, when a detected magnetic vector is newly obtained, the information processing device 3 may update the center position so that the lengths of the radii from the center position to the end points of some of the detected magnetic vectors used for estimating the center position are each brought closer to the average length of the radii (the radii corresponding to the detected magnetic vectors used for estimating the center position). For example, the center position moving process may be executed for one half of the plurality of detected magnetic vectors in one iteration of the updating process, and the center position is moved for the other half of the detected magnetic vectors in the next one iteration of the updating process, whereby the center position is moved for all of the plurality of detected magnetic vectors through the two iterations of the updating process. Then, it is possible to reduce the process load of the information processing device 3 in a single iteration of the updating process.

In the present embodiment, each time a detected magnetic vector is newly obtained, the information processing device 3 updates the center position using at least the newly-obtained detected magnetic vector. Therefore, each time a detected magnetic vector is obtained, the center position is brought gradually closer to the actual center position P. As a result, after a certain amount of time has passed, the center position is in the vicinity of the actual center position P.

Note that in the present embodiment, even if the center position is estimated to be in the vicinity of the actual center position P (e.g., where the center does not substantially move through the updating process), the information processing device 3 executes the updating process each time a detected magnetic vector is newly obtained. Then, even if there is a change to the magnetic field around the input device 2 for some reason, thereby changing the magnetic sphere, the center position is updated taking those changes into account, and it is therefore possible to more accurately calculate the center position.

(3-4: Third Process)

After the center position is set through the first process, it is possible to calculate the direction vector. Therefore, in the third process, the information processing device 3 calculates the direction vector from the center position, and calculates the attitude of the input device 2 based on the direction vector.

Note that as described above, the information processing device 3 calculates the attitude using the direction vector (the third process) at least on the condition that an area (recorded range) that is determined by the end point positions of the detected magnetic vectors obtained has become larger than a predetermined reference. Then, it is possible to reduce the possibility that an inaccurate center position is calculated and an inaccurate attitude is calculated using the inaccurate center position, and it is therefore possible to more precisely calculate the attitude.

As described above, each time a detected magnetic vector is newly obtained, the information processing device 3 updates the center position at least using the newly-obtained detected magnetic vector (the second process). Then, each time a detected magnetic vector is newly obtained, the information processing device 3 calculates the attitude of the input device 2 based on the direction vector, which is determined based on the updated center position. Then, it is possible to more precisely calculate the attitude of the input device 2 based on the more accurate center position. Note that in a single iteration of the updating process, the center position may be moved for some of a plurality of detected magnetic vectors stored in the buffer, as described above.

(Correction of Attitude by Different Method)

In the present embodiment, the information processing device 3 calculates the attitude of the input device 2 by correcting, using a direction vector, the attitude of the input device 2, which is obtained by a method using sensors (the gyrosensor 5 and the acceleration sensor 6) other than the magnetic sensor 4. That is, the information processing device 3 corrects, based on a direction vector, the attitude of the input device 2, which is calculated by a method other than the method of using detected magnetic vectors. Now, referring to FIG. 6, a method for correcting the attitude of the input device 2 using the direction vector will be described.

Figure 6:
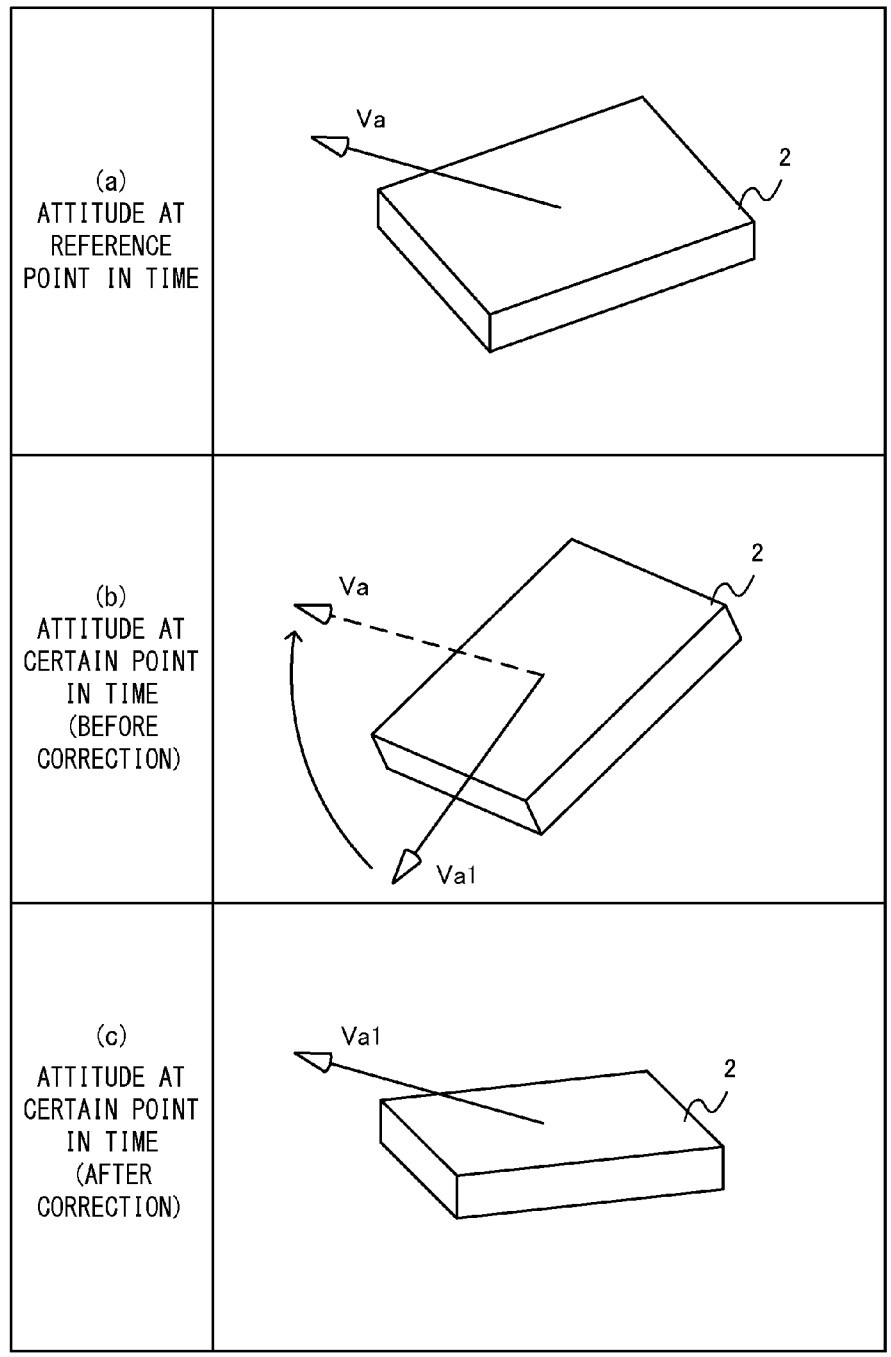
FIG. 6 is an example of a method for correcting an attitude of an input device 2 using a direction vector.

FIG. 6 is a diagram showing an example of a method for correcting the attitude of the input device 2 using a direction vector. First, the information processing device 3 sets a direction vector (reference direction vector) Va in a predetermined reference state ((a) in FIG. 6). The reference direction vector Va is a direction vector corresponding to the reference magnetic vector, for example. Note that although the center position is not calculated at the point of detecting the reference magnetic vector, the reference direction vector can be calculated from the center position and the reference magnetic vector after the center position is calculated. Note that since the direction vector is calculated with reference to the input device 2, the information processing device 3 calculates the value of the reference direction vector Va in a coordinate system based on the space (the coordinate system used for representing the attitude of the input device 2). That is, the information processing device 3 converts the coordinate system for the reference direction vector from the xyz coordinate system to the coordinate system used for representing the attitude of the input device 2.

At a point in time after the center position is set, the information processing device 3 calculates the attitude of the input device 2 using the different method. Note that the attitude of the input device 2 shown in (b) of FIG. 6 is an attitude calculated using the different method. The information processing device 3 also calculates a direction vector Va1 at this point.

Herein, since the direction vector is fixed with respect to the space, the direction vector Va1 at the point in time is supposedly in the same direction as the reference direction vector Va. Assuming that an attitude based on a detected magnetic vector is accurate, it is believed that the difference between the direction vector Va1 and the reference direction vector Va is the error in the attitude calculated using the different method. Therefore, the information processing device 3 makes a correction by rotating the attitude of the input device 2, which is calculated by using the different method, so that the direction vector Va1 lies in the same direction as the reference direction vector Va (see the arrows in (b) of FIG. 6). Note that the attitude of the input device 2 shown in (c) of FIG. 6 shows the attitude of the input device 2 after it is corrected by the direction vector.

(Calculation of Degree of Correction)

Note that while a correction is made so that the direction vector Va1 coincides with the reference direction vector Va in the example of FIG. 6, the information processing device 3 makes a correction in the present embodiment so that the direction vector Va1 is brought closer to the direction of the reference direction vector Va by a proportion determined based on the degree of correction. While the degree of correction may be determined in any manner, a plurality of different correction rates (the first correction rate and the second correction rate) are calculated based on some elements, and the degree of correction to be used eventually is set based on these degrees of correction in the present embodiment. The method for setting the degree of correction will now be described.

(First Correction Rate)

The first correction rate is set based on the degree by which (the end point of) a newly-obtained detected magnetic vector is separated from (the end points of) the detected magnetic vectors obtained thus far (referred to as the "degree of separation"). Note that the "the detected magnetic vectors obtained thus far" are those detected magnetic vectors used for the estimation of the center position at that point in time and are, in other words, the detected magnetic vectors stored in the buffer. The information processing device 3 sets the first correction rate so that the correction rate is smaller as the degree of separation is larger. The first correction rate is represented by a value of 0 or more and 100 or less, for example, and the larger it is, the greater the amount of correction based on the detected magnetic vector (in the example of FIG. 6, the direction vector Va1 is brought closer to the reference direction vector Va).

Figure 7:
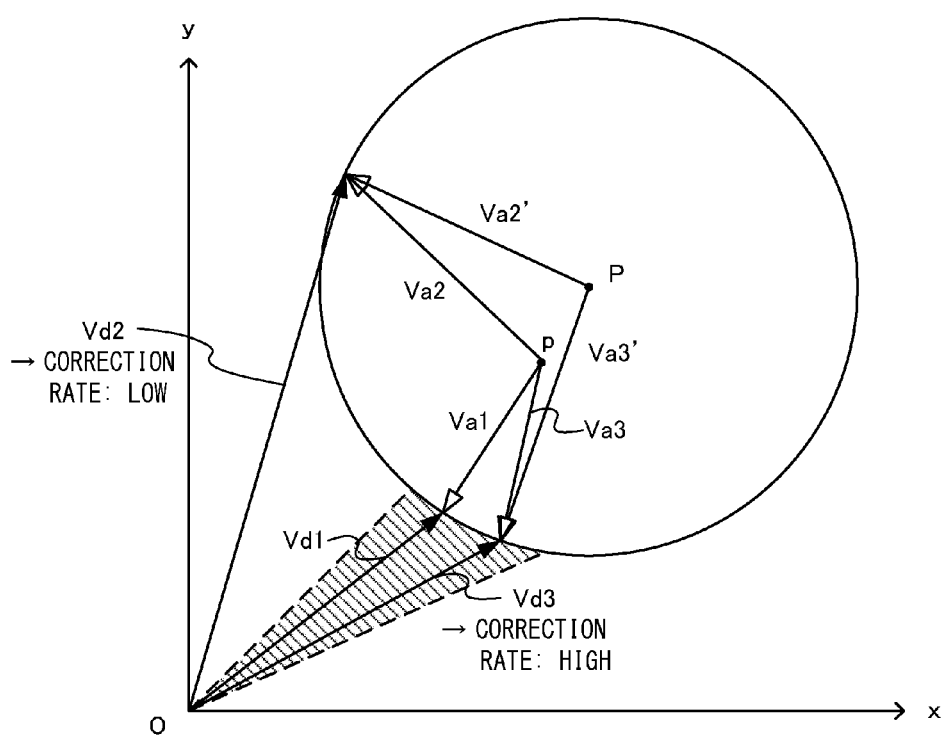
FIG. 7 is a diagram showing an example of a first correction rate setting method.

FIG. 7 is a diagram showing an example of a method for setting the first correction rate. FIG. 7 shows a case where the vector Vd2 is obtained as a new detected magnetic vector and another case where the vector Vd3 is obtained, in a state where a plurality of detected magnetic vectors including the reference magnetic vector Vd1 have been obtained. The hatched area of FIG. 7 represents the range of the plurality of detected magnetic vectors. That is, it is assumed that the plurality of detected magnetic vectors have been obtained within the range of the hatched area. The center position when a new detected magnetic vector (Vd2 or Vd3) is obtained is denoted as the position p. It is assumed that the center position p is set based on the plurality of reference direction vectors, and is slightly different from the actual center position P.

Referring to FIG. 7, consider a case where the detected magnetic vector Vd2 is obtained. The detected magnetic vector Vd2 is separated from the range of the plurality of detected magnetic vectors obtained thus far. Herein, where the new detected magnetic vector Vd2 is separated from the range, the direction of a direction vector Va2 corresponding to the new detected magnetic vector may have an increased difference from the correct direction (the direction of the vector Va2' extending from the actual center position P to the end point of the detected magnetic vector Vd2) (see FIG. 7). That is, the direction vector Va2 may be inaccurate. Therefore, in such a case, the first correction rate is set to be relatively small.

On the other hand, referring to FIG. 7, consider a case where the detected magnetic vector Vd3 is obtained. The detected magnetic vector Vd3 is included within (close to) the range of the plurality of detected magnetic vectors obtained thus far. Thus, where the new detected magnetic vector Vd3 is close to the range, the direction of a direction vector Va3 corresponding to the new detected magnetic vector has a small difference from the correct direction (the direction of the vector Va3' extending from the actual center position P to the end point of the detected magnetic vector Vd3). That is, the direction vector Va3 can be considered accurate to some degree. Therefore, in such a case, the first correction rate is set to be relatively large.

As described above, in the present embodiment, the information processing device 3 sets the degree of correction (the first correction rate) to be smaller as the end point position of the newly-obtained detected magnetic vector is farther away from the end point position of the detected magnetic vector used for the estimation of the center position. Then, if there is a possibility that the direction vector corresponding to the new detected magnetic vector is not accurate, it is possible to calculate the attitude of the input device 2 while setting the degree of correction to be low, for example, so as to decrease the influence of the direction vector. Thus, it is possible to reduce the possibility that an inaccurate attitude is obtained. For example, where the direction vector corresponding to the new detected magnetic vector can be considered accurate, it is possible to calculate the attitude of the input device 2 while setting the degree of correction to be high, for example, so as to increase the influence of the direction vector. Then, it is possible to improve the possibility that an accurate attitude is calculated. Thus, by setting the degree of correction based on the degree of separation, it is possible to precisely calculate the attitude of the input device 2.

In the present embodiment, the information processing device 3 determines the degree of separation using the difference between the length (radius) from the center position to the end point position of a new detected magnetic vector and the radius that is determined by the detected magnetic vectors used for the estimation of the center position. That is, the degree of separation can be determined to be large when the difference is large, and the degree of separation can be determined to be small when the difference is small. Therefore, in the present embodiment, the information processing device 3 sets the degree of correction (the first correction rate) based on the difference. Thus, by using the radius difference, it is possible to accurately determine the degree of separation.

Note that the "radius that is determined by the detected magnetic vectors used for the estimation of the center position" is a radius that is determined by the lengths (radii) from the center position to the end point positions of the detected magnetic vectors used for the estimation of the center position. This radius may be determined, for example, as a radius corresponding to the reference magnetic vector (the magnitude of the direction vector Va1 shown in FIG. 7) or as the average radius described above.

As described above, in the present embodiment, the information processing device 3 calculates the attitude of the input device 2 while relatively decreasing the influence of the new detected magnetic vector as the degree of separation is larger. That is, the present embodiment employs the degree of correction, as a method for adjusting the influence of the new detected magnetic vector, for the calculation of the attitude of the input device 2. Herein, in other embodiments, the method may be any method, and is not limited to a method using the degree of correction. For example, in other embodiments, the correction using the direction vector may not be performed (the degree of correction is set to "0") when the degree of separation is greater than a predetermined reference, whereas the correction using the direction vector is performed when the degree of separation is less than or equal to the predetermined reference.

Even if another attitude calculation method different from the method of calculating the attitude using the magnetic sensor 4 is not used, the information processing device 3 may calculate the attitude of the input device 2 while varying the influence of the new detected magnetic vector based on the degree of separation. For example, the information processing device 3 may calculate the current attitude based on a first attitude that is calculated based on a detected magnetic vector obtained in the past and a second attitude that is calculated based on a newly-obtained detected magnetic vector. In other words, the information processing device 3 may correct the attitude of the input device calculated in the past based on the newly-obtained detected magnetic vector (the direction vector corresponding to the detected magnetic vector). Then, the information processing device 3 may determine the rate by which the second attitude is reflected on the current attitude based on the degree of separation.

As described above, in the present embodiment, the information processing device 3 calculates the attitude of the input device 2 while relatively decreasing the influence (influence on the attitude calculation) of the new detected magnetic vector as the end point position of the newly-obtained detected magnetic vector is farther away from the end point positions of the detected magnetic vectors used for the estimation of the center position. Then, it is possible to calculate the attitude of the input device 2 even if the estimated center position does not converge to the vicinity of the actual center position. For example, referring to FIG. 7, the estimated center position p is slightly away from the actual center position P. In such a state, there is a possibility that the direction vector is not accurate, whereby it appears that it is not possible to accurately calculate the attitude. However, even in such a state, it can be assumed that the direction vector is accurate to some degree, allowing for calculation of the attitude, in some cases (i.e., where the degree of separation is small). That is, in the present embodiment, even if the estimated center position has not sufficiently converged to the vicinity of the actual center position, the information processing device 3 calculates the attitude using the direction vector when it is expected that the calculation will not result in an inaccurate attitude. Thus, since it is possible to calculate the attitude before the center position is sufficiently converged, it is possible to calculate the attitude early. Since it is possible to calculate the attitude even when it is not possible to obtain sufficient detected magnetic vectors needed for calculating the actual center position, it is possible to calculate the attitude on more occasions. Therefore, it is possible to calculate the attitude of the input device 2 while normal operations are being performed using the input device 2, without requiring the user to perform a preliminary operation such as to move the input device 2 in a figure eight motion as described above, for example.

The magnetic sensor 4 may detect an abnormal detected magnetic vector for some reason. An abnormal detected magnetic vector typically refers to a vector whose end point is positioned totally off the surface of the magnetic sphere estimated from other detected magnetic vectors. If the center position is estimated using such an abnormal detected magnetic vector, it may not be possible to accurately calculate the center position. Herein, by varying the influence of the new detected magnetic vector based on the degree of separation, it is possible to reduce the influence of the abnormal detected magnetic vector and to precisely calculate the attitude of the input device 2.

In the present embodiment, the information processing device 3 determines the degree of separation using the difference in radius described above. Herein, in the present embodiment, the difference in radius decreases as the center position becomes more accurate (comes closer to the actual center position) through the updating process. Therefore, by using the difference in radius, the information processing device 3 can adjust the influence of the new detected magnetic vector on the attitude calculation while taking into account the accuracy of the center position in addition to the degree of separation. In the present embodiment, since the center position gradually becomes more accurate over time because of the updating process, the influence can be increased over time. That is, according to the present embodiment, even if the range over which the attitude is calculated based on detected magnetic vectors (or the range over which the influence of the attitude calculation is large) is limited at first, the range can be expanded over time. Moreover, it is possible to calculate the attitude more accurately over time.

Note that the degree of separation may be determined in any manner. For example, in other embodiments, the degree of separation may be calculated based on the end point positions of the detected magnetic vectors. Specifically, the degree of separation may be calculated based on the distance between the recorded range and the new detected magnetic vector. In other embodiments, the degree of separation may be calculated based on the difference between the direction of the direction vector corresponding to the new detected magnetic vector and the direction of the direction vector corresponding to the detected magnetic vectors obtained thus far.

In the present embodiment, the center position updating process (the second process) described above is executed independent of the value of the first correction rate (irrespective of the value of the first correction rate). That is, the information processing device 3 updates the center position using a new detected magnetic vector, independent of the relationship between the end point position of the new detected magnetic vector and the end point positions of the detected magnetic vectors used for the estimation of the center position. Then, the center position is updated to a more accurate position even if the attitude is not calculated because the degree of separation described above is larger (or the influence of the attitude calculation based on the detected magnetic vector is small). Therefore, it is possible to precisely calculate the center position, and even if the attitude is not calculated at a certain point in time, the attitude can be later calculated.

(Second Correction Rate)

The second correction rate is set based on the difference between the direction of the direction vector corresponding to a newly-obtained detected magnetic vector and the direction of the direction vector corresponding to a detected magnetic vector at the time of a predetermined operation performed by the user (herein, the reference magnetic vector). The information processing device 3 sets the second correction rate so that the correction rate is smaller as the direction difference is larger. As is the first correction rate, the second correction rate is represented by a value of 0 or more and 100 or less, for example, and the larger it is, the greater the amount of correction based on the detected magnetic vector.

Figure 8:
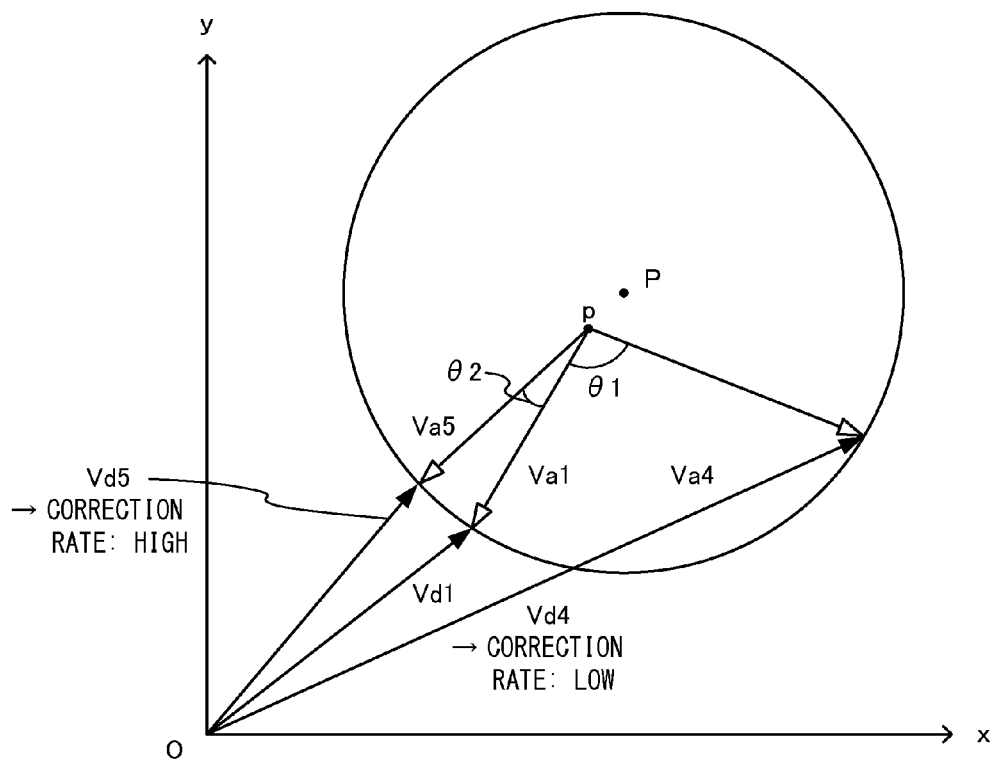
FIG. 8 is a diagram showing an example of a second correction rate setting method.

FIG. 8 is a diagram showing an example of a method for setting the second correction rate. FIG. 8 shows a case where the vector Vd4 is obtained as a new detected magnetic vector and another case where the vector Vd5 is obtained, in a state where a plurality of detected magnetic vectors including the reference magnetic vector Vd1 have been obtained. The center position when a new detected magnetic vector (Vd4 or Vd5) is obtained is denoted as the position p.

Referring to FIG. 8, consider a case where the detected magnetic vector Vd4 is obtained. The direction of a direction vector Va4 corresponding to the detected magnetic vector Vd4 has a relatively large difference (the angle θ1) from the direction of a reference direction vector Va1 corresponding to the reference magnetic vector Vd1. Herein, where the direction difference is large, it is considered that the attitude of the input device 2 has changed significantly from the attitude at the reference point in time (at the start of the use of the input device 2). If the attitude of the input device 2 changes significantly from the attitude at the reference point in time, there is a possibility that the magnetic field around the input device 2 may change. For example, as the attitude of the input device 2 is changed, the position thereof may also change, thereby also changing the surrounding magnetic field. Specifically, it is possible that the surrounding magnetic field changes as the input device 2 is moved closer to a metal wall. Thus, if the attitude of the input device 2 changes significantly from the attitude at the reference point in time, it may not be possible to accurately calculate the attitude based on the detected magnetic vector. Therefore, the information processing device 3 sets the second correction rate to be relatively small when the direction difference is large.

On the other hand, referring to FIG. 8, consider a case where the detected magnetic vector Vd5 is obtained. The direction of a direction vector Va5 corresponding to the detected magnetic vector Vd5 has a relatively small difference (the angle θ2) from the direction of the reference direction vector Va1 corresponding to the reference magnetic vector Vd1. Where the direction difference is small, it is unlikely that the magnetic field around the input device 2 has changed, and it is therefore considered unlikely that the attitude cannot be calculated accurately. Therefore, the information processing device 3 sets the second correction rate to be relatively large when the direction difference is small.

As described above, in the present embodiment, the information processing device 3 sets, as the reference magnetic vector, a detected magnetic vector that is detected at the time of a predetermined operation performed by the user. Then, the attitude of the input device 2 is calculated while relatively decreasing the influence of a new detected magnetic vector as the direction from the center position to the new detected magnetic vector is farther away from the direction from the center position to the reference magnetic vector. Therefore, it is possible to reduce the possibility that the calculation results in an inaccurate attitude due to the change of the magnetic field around the input device 2, thereby allowing for precise attitude calculation.

(Calculation of Final Degree of Correction)

In the present embodiment, the final degree of correction is calculated based on the first correction rate and the second correction rate. For example, the information processing device 3 multiplies together the first correction rate and the second correction rate, and further multiplies the product by a predetermined coefficient to obtain the degree of correction. Note that in other embodiments, the final degree of correction may be calculated based on one of the first correction rate and the second correction rate. For example, where such an operation is expected to be performed that the attitude of the input device 2 will change in every direction, the degree of correction may be calculated without using the second correction rate. The information processing device 3 may prevent the degree of correction from increasing rapidly (see steps S36 and S37 to be described later). This is for preventing the attitude of the input device 2 calculated by the information processing device 3 from changing rapidly by the correction using the direction vector.

Note that in the present embodiment, the attitude of the input device 2, which is calculated by the different method (a method using the gyrosensor 5 and the acceleration sensor 6), is corrected by a direction vector. Herein, in other embodiments, the information processing device 3 may calculate the attitude of the input device 2 based on the direction vector without using the different method.

(Determination on Whether or not to Calculate Attitude)

In the present embodiment, in the third process, the information processing device 3 calculates the attitude of the input device 2 based on the direction vector if a predetermined condition regarding the center position is satisfied. That is, where if the degree of reliability of the estimated center position as a position that represents the actual center position of the magnetic sphere is low, the information processing device 3 does not calculate the attitude of the input device 2 based on the detected magnetic vector, thereby reducing the possibility that an inaccurate attitude is obtained.

In the present embodiment, the information processing device 3 calculates the reliability of the center position based on the center position and the detected magnetic vectors stored in the buffer. If the reliability is higher than a predetermined reference, the information processing device 3 calculates the attitude of the input device 2, and if the reliability is lower than the predetermined reference, the information processing device 3 does not calculate the attitude of the input device 2.

Figures 9, 10:
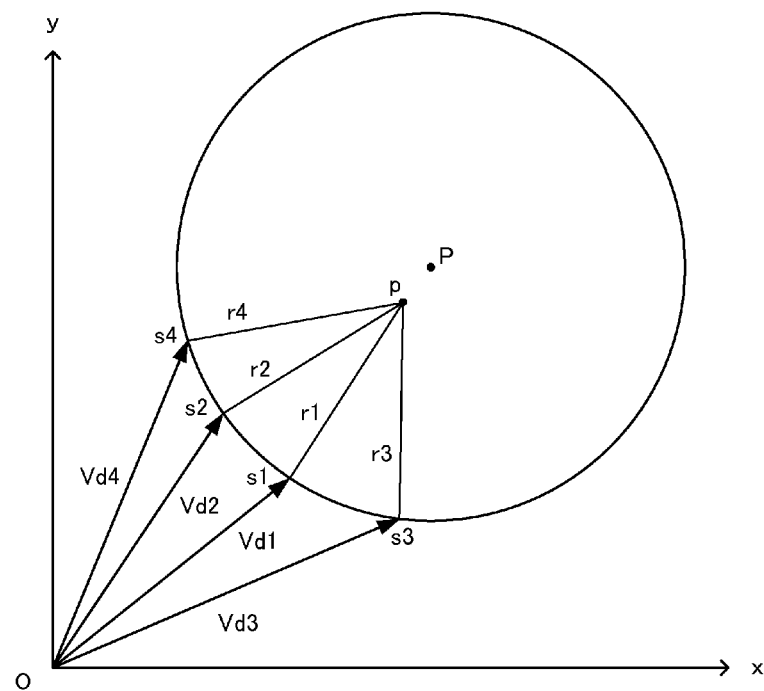
FIG. 9 is a diagram showing an example of a center position where the reliability is calculated to be high.
FIG. 10 is a diagram showing an example of a buffer configuration.

Specifically, the information processing device 3 calculates the reliability to be lower as the amount of movement of the center position before and after the updating process is larger. The information processing device 3 also calculates the reliability to be lower as the dispersion between the lengths of the radii connecting the center position to the end points of the detected magnetic vectors is large. This is because if the amount of movement before and after the update is large or if the dispersion between the lengths of the radii is large, the center position has not yet converged sufficiently and is likely to be inaccurate. For example, in the case of FIG. 4, the dispersion between the lengths of the radii r1 to r4 is large and the movement of the center position is also large. Therefore, the reliability is calculated to be low, and the attitude is not calculated. On the other hand, FIG. 9 shows an example of the center position where the reliability is calculated to be high. In the case shown in FIG. 9, the dispersion between the lengths of the radii r1 to r4 is small, and the movement of the center position is small. Therefore, the reliability is calculated to be high, and accordingly the attitude is calculated.

Note that in the present embodiment, as an indicator representing the dispersion between the lengths of the radii, a value is used that is obtained by accumulating, for each radius, the square of the difference between the radius and the average radius. Note that the indicator may be any indicator, and it may be, for example, the difference between the largest radius and the smallest radius, the difference between the average radius and the largest or smallest radius, the standard deviation of the radii, etc.

In the present embodiment, the reliability calculation is performed in response to the attitude of the input device 2 having changed by an amount more than a predetermined reference. That is, each time a detected magnetic vector is obtained, the information processing device 3 determines whether the direction of the direction vector corresponding to the detected magnetic vector has changed by an amount greater than the predetermined reference. If the direction of the direction vector has changed by an amount greater than the predetermined reference, the information processing device 3 newly calculates the reliability. On the other hand, if the direction of the direction vector has not changed by an amount greater than the predetermined reference, the reliability is not newly calculated, and the previous reliability is maintained. This is because it is believed that where the attitude of the input device 2 (the detected magnetic vector) has not changed, the degree of reliability of the center position has also not changed. Thus, according to the present embodiment, it is possible to reduce the process load of the reliability calculation. Note that in other embodiments, the reliability may be calculated at a rate of once per a predetermined period (e.g., each time a detected magnetic vector is obtained).

As described above, in the present embodiment, the information processing device uses the amount of movement of the center position before and after the update and the dispersion between the lengths of the radii as indicators reflecting the reliability of the center position, and determines whether or not to calculate the attitude of the input device 2 based on the indicator. Herein, in other embodiments, the information processing device 3 may vary, depending on the indicator, the influence of the obtained detected magnetic vectors on the attitude calculation. For example, the information processing device 3 may set the degree of correction based on the indicator.

As described above, the information processing device 3 calculates the attitude of the input device 2 while relatively decreasing the influence of a new detected magnetic vector as the amount of change of the center position before and after the update is larger. Then, it is possible to reduce the possibility that an inaccurate attitude is obtained, and to improve the precision of the attitude calculation.

Moreover, the information processing device 3 calculates the attitude while relatively decreasing the influence of a newly-obtained detected magnetic vector as the dispersion between the lengths (the lengths of the radii) from the current center position to the end point positions of the detected magnetic vectors used for the estimation of the center position. Then, it is possible to reduce the possibility that an inaccurate attitude is obtained, and to improve the precision of the attitude calculation.

Note that in other embodiments, the information processing device 3 may calculate the reliability based on one of the amount of movement of the center position before and after the update and the dispersion between the lengths of the radii. That is, the influence of a new detected magnetic vector on the attitude calculation may be adjusted based on one of the amount of movement of the center position before and after the update and the dispersion between the lengths of the radii.

(3-5: Method for Storing Detected Magnetic Vectors)

In the present embodiment, the information processing device 3 uses a buffer for storing detected magnetic vectors while classifying the detected magnetic vectors based on a condition. Then, the center position is estimated (calculated) using the detected magnetic vectors stored in the buffer. That is, in the present embodiment, those detected magnetic vectors deleted from the buffer are not used for the estimation of the center position. In order to efficiently and precisely calculate the center position, the information processing device 3 uses the buffer to select those detected magnetic vectors that are to be used for the calculation of the center position. A method for storing the obtained detected magnetic vectors in the buffer will now be described.

Figure 11:
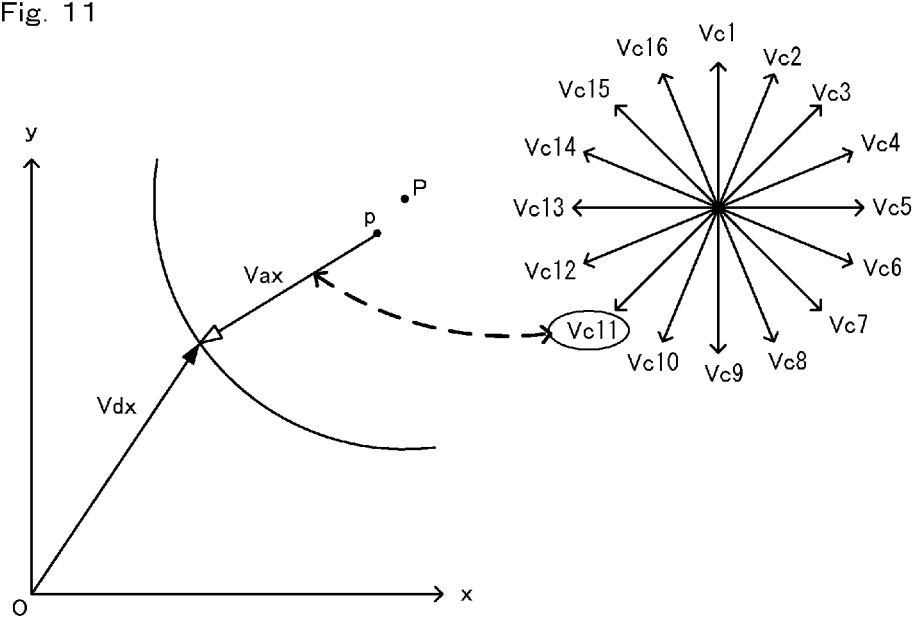
FIG. 11 is a diagram showing an example of a method for classifying detected magnetic vectors.

In the present embodiment, the information processing device 3 stores each obtained detected magnetic vector in the buffer while classifying the detected magnetic vector in one of categories based on the direction from a reference position to the end point position of the detected magnetic vector. Note that each category is defined based on the direction from the reference position to the end point position of the detected magnetic vector. The reference position is determined based on the detected magnetic vectors, and in the present embodiment, if a center position has been set, the reference position is the center position. That is, in the present embodiment, if the directions of the direction vectors corresponding to detected magnetic vectors are equal or close to each other, the detected magnetic vectors are classified in the same category. Referring to FIGS. 10 and 11, the details will be described below.

FIG. 10 is a diagram showing an example of a buffer configuration in the present embodiment. As shown in FIG. 10, the buffer includes a plurality of areas each for storing detected magnetic vectors of one of a plurality of (16 in FIG. 10) classification vectors. Each classification vector is a vector (herein, a unit vector) representing a direction in a space (an xyz space) used for representing detected magnetic vectors. The classification vectors Vc1 to Vc16 represent different directions from each other. The classification vectors Vc1 to Vc16 are set so that the directions thereof are evenly dispersed, the details of which will be described later. The classification vectors are set in advance. The number of classification vectors may be any number. In the present embodiment, the number of classification vectors is fixed.

Note that the buffer may be any storage unit that is accessible by the information processing device 3. For example, in the present embodiment, the buffer is provided in the memory 9 of the information processing device 3.

FIG. 11 is a diagram showing an example of a method for classifying detected magnetic vectors. In FIG. 11, assume that a detected magnetic vector Vdx has been obtained, and the center position at this point in time is the position p. Then, the information processing device 3 calculates a direction vector Vax corresponding to the detected magnetic vector Vdx. Then, one of the plurality of classification vectors Vc1 to Vc16 whose direction is closest to the direction vector Vax is selected. In the example of FIG. 11, the classification vector Vc11 whose direction is closest to the direction vector Vax is selected. The information processing device 3 stores the obtained detected magnetic vector in an area corresponding to the selected classification vector. In the example of FIG. 11, since the classification vector Vc11 whose direction is closest to the direction vector Vax is selected, the detected magnetic vector Vdx corresponding to the direction vector Vax is stored in the area corresponding to the classification vector Vc11 (see FIG. 10). Note that in the present embodiment, if a detected magnetic vector is already stored in the area where the new detected magnetic vector is to be stored, the area is overwritten with the new detected magnetic vector, deleting the older detected magnetic vector.

As described above, in the present embodiment, detected magnetic vectors are classified based on the direction from the reference position to the end points of the detected magnetic vectors, and the center position is estimated by using one detected magnetic vector from each set of detected magnetic vectors classified into the same category. Thus, the number of detected magnetic vectors used for the estimation of the center position can be limited to a certain number, and it is therefore possible to reduce the process load for the center position estimation process.

In the present embodiment, the detected magnetic vectors are classified based on the direction from the reference position to the end point of each detected magnetic vector. Now, the estimated center position is likely to be calculated more accurately by using direction vectors extending in various directions. Therefore, by classifying the detected magnetic vectors based on the direction from the reference position to the end point of each detected magnetic vector, it is possible to more accurately estimate the center position using the detected magnetic vectors extending in various directions.

In the present embodiment, the reference position is set to be the center position. That is, the information processing device 3 sets the reference position on, or on the inner side of, the surface of the magnetic sphere. Then, detected magnetic vectors corresponding to direction vectors extending in various directions can be stored in the buffer, and it is therefore possible to more accurately estimate the center position.

Note that in the present embodiment, before the center position is set, the reference position is set to be the end point position of the reference magnetic vector. Moreover, before the center position is set, each time a new detected magnetic vector is obtained, the reference position is updated by a method similar to the center position updating process. Therefore, even before the center position is set, the reference position is set on, or on the inner side of, the surface of the magnetic sphere.

After the center position is set, each time a detected magnetic vector is obtained, the information processing device 3 classifies the obtained detected magnetic vector using the latest center position as the reference position. Then, it is possible to obtain more accurate direction vectors for the classification. Thus, it is possible to more accurately classify detected magnetic vectors. Note that as described above, the information processing device 3 updates the center position each time a detected magnetic vector is newly stored. Therefore, since the center position and the reference position are updated each time a detected magnetic vector is obtained, it is possible to obtain more accurate direction vectors for the classification.

In the present embodiment, detected magnetic vectors are classified using the classification vectors. That is, the information processing device 3 selects one of a plurality of classification vectors extending in different directions from one another. The selected classification vector extends in a direction that is closest to the direction from the reference position to the end point of a detected magnetic vector. The information processing device 3 classifies detected magnetic vectors for which different classification vectors are selected into different categories. Then, it is easy to classify detected magnetic vectors. For example, a detected magnetic vector can be classified easily by calculating the inner product between each classification vector and a vector representing the direction from the reference position to the end point of the detected magnetic vector.

Note that in other embodiments, ranges of directions may be set, instead of classification vectors, for different areas of the buffer. Then, the information processing device 3 selects one of the ranges set for different areas that comprises the direction from the reference position to the end point of a detected magnetic vector, and stores the detected magnetic vector in the area corresponding to the selected range. It is also possible in this manner to easily classify detected magnetic vectors.

In the present embodiment, the information processing device 3 stores, in the buffer, one detected magnetic vector representing each set of detected magnetic vectors classified into the same category. That is, for each set of detected magnetic vectors belonging to the same class, one detected magnetic vector is stored in the buffer. Thus, it is possible to limit the number of detected magnetic vectors stored in the buffer to a certain number, and to reduce the data size of the buffer.

Note that in other embodiments, for each category, a number of (or all of) detected magnetic vectors classified into the category may be stored. Then, the information processing device 3 may extract a predetermined number (e.g., one) of detected magnetic vectors for each category so as to estimate the center position using the extracted detected magnetic vectors. Then, as in the present embodiment, it is possible to select detected magnetic vectors to be used for the estimation of the center position, and to efficiently calculate the center position.

Moreover, in the present embodiment, where a detected magnetic vector is already stored in an area of the buffer, a new detected magnetic vector is stored therein, overwriting the area with the new detected magnetic vector. That is, when a new detected magnetic vector is obtained, if another detected magnetic vector is already stored for the category into which the new detected magnetic vector should be classified, the information processing device 3 stores the new detected magnetic vector, overwriting the previously-stored detected magnetic vector. Then, a detected magnetic vector already stored in the same area is deleted.

Note that as described above, the magnetic sensor 4 may detect an abnormal detected magnetic vector for some reason. In the present embodiment, since detected magnetic vectors can be overwritten, even if an abnormal detected magnetic vector is stored in a buffer, it can be overwritten with another detected magnetic vector that is not abnormal, thereby allowing for calculation of the center position while eliminating the influence of the abnormal detected magnetic vector. Thus, it is possible to precisely calculate the center position.

Note that other than the method of overwriting an old detected magnetic vector with a new detected magnetic vector, the method for storing, in the buffer, one detected magnetic vector representing a set of detected magnetic vectors classified into the same category may be a method of producing another detected magnetic vector for a plurality of detected magnetic vectors classified into the same category based on the plurality of detected magnetic vectors, and storing the produced detected magnetic vector. For example, in other embodiments, an average vector may be produced based on a plurality of detected magnetic vectors classified into the same category, and the average vector may be stored in the buffer. Then, it is possible to calculate the center position while reducing the influence of abnormal detected magnetic vectors.

Figure 12:
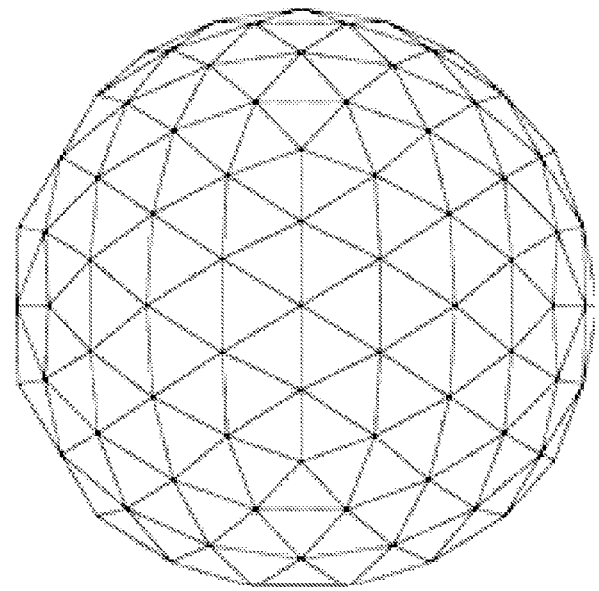
FIG. 12 is a diagram showing an example of end point positions of classification vectors arranged in a three-dimensional space.

In the present embodiment, the classification vectors are set so that the directions thereof are evenly dispersed. That is, a plurality of classification vectors are arranged so that where the start points of the classification vectors are at the center of a sphere, the end points of the classification vector are evenly dispersed across the spherical surface of the sphere (which may be a half spherical surface where the number of classification vectors is reduced in half, as will be described later). FIG. 12 is a diagram showing an example of end point positions of classification vectors arranged in a three-dimensional space in the present embodiment. Note that while the classification vectors are shown to be arranged on a plane in FIG. 11, the classification vectors are actually arranged in a three-dimensional space as shown in FIG. 12 in the present embodiment. For example, each classification vector is set as a vector whose start point is at the center of the polyhedron shown in FIG. 12 and whose end point is at one apex of the polyhedron. As shown in FIG. 12, the plurality of classification vectors are set so that the directions thereof are evenly dispersed. Thus, the center position can be estimated using the evenly-dispersed detected magnetic vectors, and it is therefore possible to accurately estimate the center position. Note that the classification vectors do not need to be set so that the directions thereof are dispersed strictly evenly, but the advantageous effect of accurately estimating the center position can be obtained as long as they are set so that the directions thereof are generally evenly dispersed.

In the present embodiment, each classification vector is set so that there is another classification vector extending in the opposite direction. That is, the information processing device 3 sets a plurality of pairs of classification vectors, each pair including two classification vectors extending in opposite directions. The information processing device 3 selects a classification vector by calculating the inner product between two vectors. That is, the information processing device 3 calculates the inner product between each classification vector and the direction vector representing the direction from the reference position to the end point of the detected magnetic vector, and selects a classification vector for which the inner product value is largest.

Herein, in the present embodiment, since each classification vector is set so that there is another classification vector extending in the opposite direction, the information processing device 3 can select a classification vector by executing, for each pair, the process of calculating the inner product only for one of the classification vectors of the pair. Specifically, the information processing device 3 can identify a classification vector for which the absolute value of the inner product value is largest, and then select the identified classification vector if the sign of the inner product value is positive, and a classification vector extending in the opposite direction from the identified classification vector if the sign of the inner product value is negative. Thus, by using pairs of classification vectors each including two classification vectors of opposite directions, it is possible to reduce in half the number of times the inner product is calculated for the selection of a classification vector.

Note that in other embodiments, the information processing device 3 may classify detected magnetic vectors by using a half of the classification vectors of the embodiment described above. That is, in other embodiments, for each pair of classification vectors, only one of the two classification vectors may be set. Then, the information processing device 3 first selects a classification vector based on the absolute value of the inner product. Specifically, as in the present embodiment, the process of calculating the inner product is executed for each classification vector so as to select a classification vector for which the absolute value is largest. Moreover, the information processing device 3 classifies detected magnetic vectors into different categories based on the sign of the inner product values. Then, it is possible to reduce in half the number of times the inner product is calculated, and it is also possible to reduce the number of classification vectors to be prepared.

[4. Specific Example Process Executed by Information Processing System]

Figure 13:
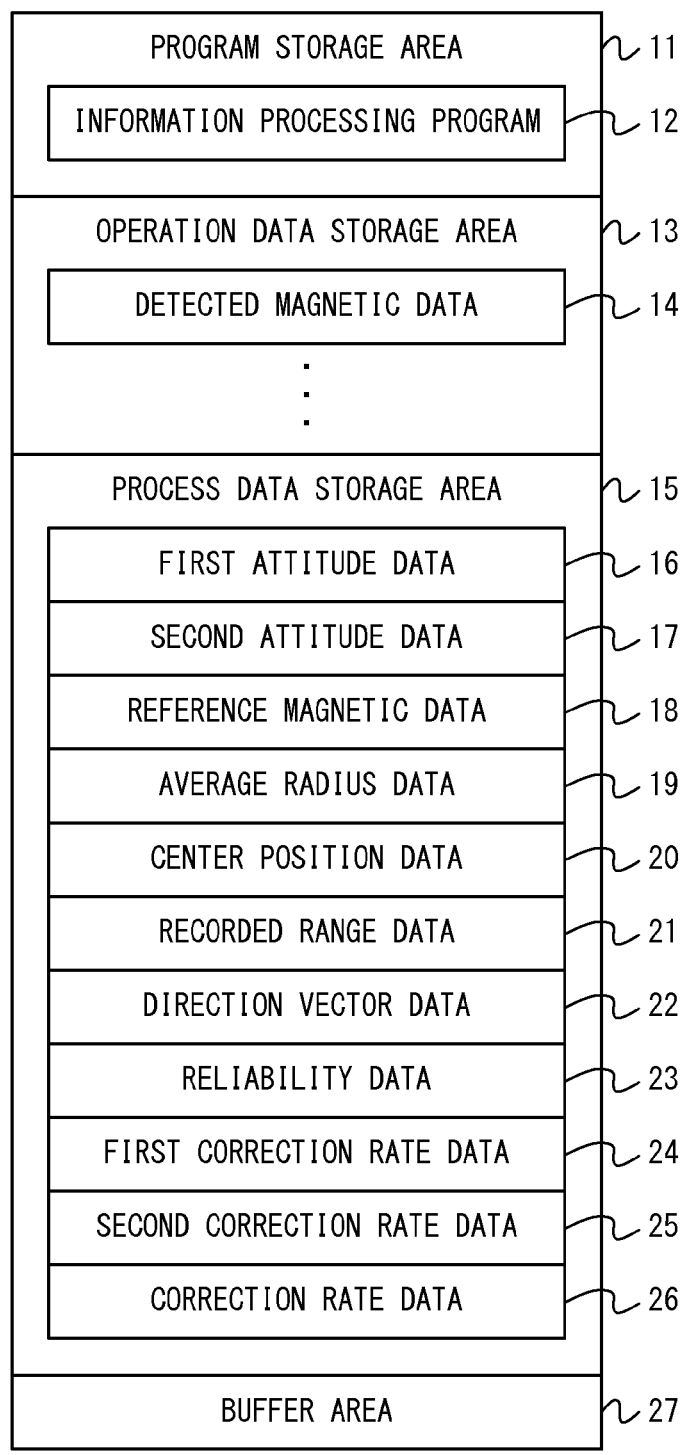
FIG. 13 is a diagram showing an example of a data area which is set in a storage unit of an information processing system.

Now, referring to FIGS. 13 to 16, a specific example process to be executed by the information processing system 1 (the information processing device 3) in the present embodiment will be described. FIG. 13 is a diagram showing an example of a data area which is set in a storage unit (the memory 9) of the information processing system 1 in the present embodiment. As shown in FIG. 13, a program storage area 11, an operation data storage area 13, a process data storage area 15, and a buffer area 27 are set in the memory 9 of the information processing device 3. Note that areas for storing images to be output to the display device or image data used to produce those images, in addition to the data shown in FIG. 13, may be set in the memory 9.

The program storage area 11 stores an information processing program 12. The information processing program 12 is a program to be executed by a computer (the CPU 8) of the information processing device 3. Note that the information processing program 12 is stored in a program storing unit (a storage device, a storage medium, etc.) that is provided inside or outside the information processing device 3 and accessible from the information processing device 3. A part or whole of the information processing program 12 stored in the program storing unit is loaded to the memory 9 at an appropriate point in time and executed by the CPU 8. A part or whole of the information processing program 12 may be pre-stored (e.g., as a library) in the information processing device executing the information processing program 12.

The operation data storage area 13 stores operation data transmitted from the input device 2. In the present embodiment, the operation data storage area 13 stores, as the operation data, detected magnetic data 14 representing the detected magnetic vector. The operation data storage area 13 stores data representing the detection results of the gyrosensor 5 (the angular velocity), data representing the detection results of the acceleration sensor 6 (the acceleration), and data representing operations performed on the operation unit 7.

Figure 14:
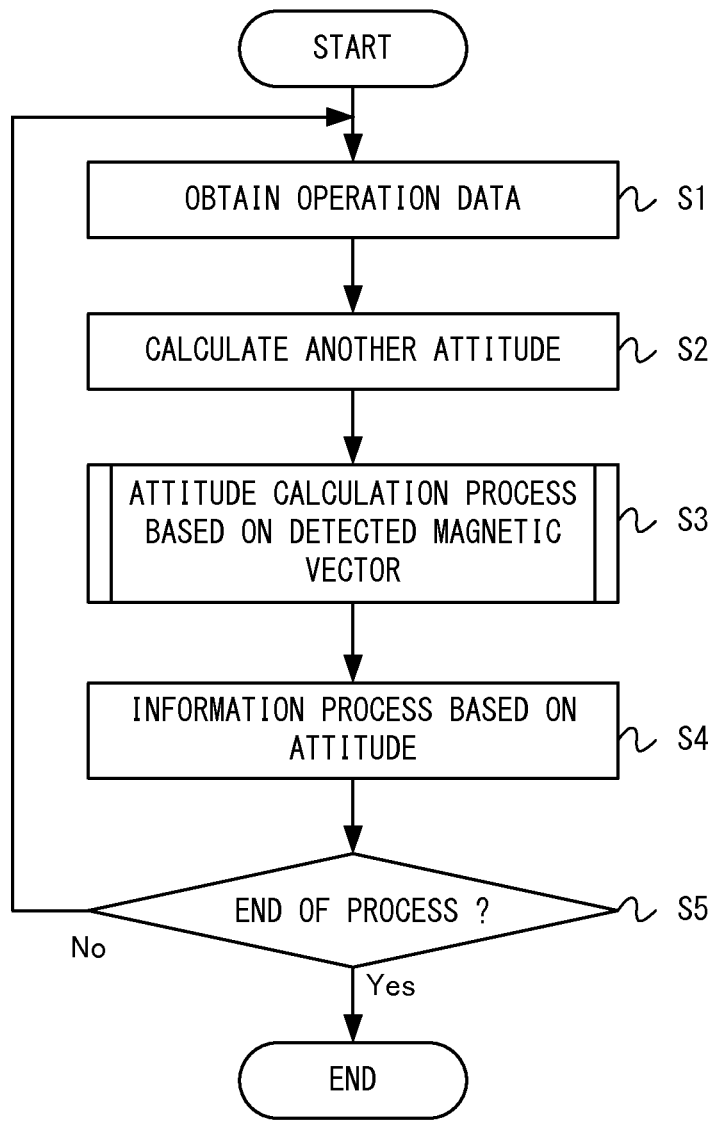
FIG. 14 is an example non-limiting flow chart showing the flow of an information process executed by a CPU of an information processing device.

The process data storage area 15 stores various data used in the information process executed by the information processing device 3 (the information process shown in FIG. 14). The process data storage area 15 stores first attitude data 16, second attitude data 17, reference magnetic data 18, average radius data 19, center position data 20, recorded range data 21, direction vector data 22, reliability data 23, first correction rate data 24, second correction rate data 25, and degree of correction data 26.

The first attitude data 16 is data representing the attitude of the input device 2 calculated by the different method other than the method of using the magnetic sensor 4 (detected magnetic vectors). The second attitude data 17 is data representing the attitude of the input device 2 calculated based on detected magnetic vectors. In the present embodiment, the second attitude data 17 is data representing an attitude obtained by correcting the attitude represented by the first attitude data 16 with a direction vector.

The reference magnetic data 18 is data representing the reference magnetic vector. The average radius data 19 is data representing the length of the average radius. The center position data 20 is data representing the center position estimated by the information processing device 3. The recorded range data 21 is data representing the area of the recorded range.

Herein, in the present embodiment, after the center position is set, the center position is set to the reference position. Before the center position is set, the reference position is updated by the same method as that of the center position. Therefore, since the reference position and the center position are of the same value, the information processing device 3 does not need to store the reference position and the center position as separate data, but can store them as single data. Therefore, in the process example to be described herein, the information processing device 3 uses the center position data 20, as data for representing the reference position and the center position. That is, the center position data 20 represents the reference position in a stage before the initial center position is set.

The direction vector data 22 is data representing the direction vector. Herein, the direction vector represented by the direction vector data 22 is a direction vector determined based on the latest center position. The direction vector represented by the direction vector data 22 is a direction vector corresponding to the newly-obtained detected magnetic vector (the latest detected magnetic vector).

The reliability data 23 is data representing the reliability. The first correction rate data 24 is data representing the first correction rate. The second correction rate data 25 is data representing the second correction rate. The degree of correction data 26 is data representing the degree of correction when correcting the attitude represented by the first attitude data 16 with the attitude based on the direction vector. The degree of correction data 26 represents the degree of correction calculated based on the first correction rate and the second correction rate.

The buffer area 27 is an area in the buffer for storing detected magnetic vectors. The buffer area 27 stores detected magnetic data that have been classified by the method described above in "(3-5: Method for storing detected magnetic vectors)", among all the data stored as the detected magnetic data 14.

Other than the data described above, the memory 9 stores data used in processes performed by the information processing device (FIG. 14), such as the classification vectors, threshold values used for determinations, etc.

Next, the detailed flow of the information process in the present embodiment will be described. FIG. 14 is a flow chart showing an example flow of the information process to be executed by the CPU 8 of the information processing device 3 in the present embodiment. In the present embodiment, when the information processing system 1 is started, the CPU 8 of the information processing device 3 initializes storage units such as the memory 9, and loads the information processing program 12 from the program storage unit onto the memory 9. Then, the CPU 8 starts executing the information processing program 12.

Figure 15:
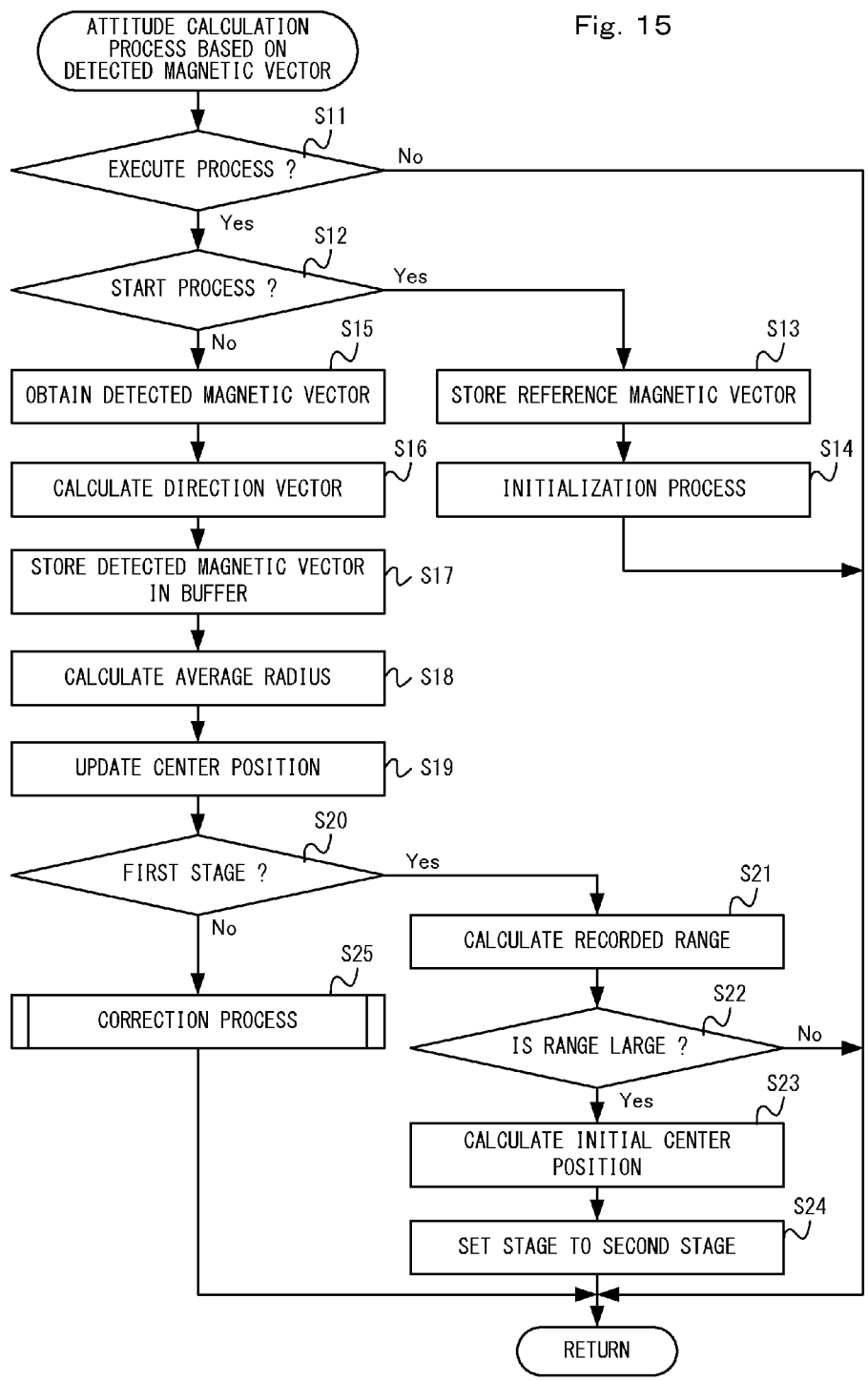
FIG. 15 is an example non-limiting flow chart showing a detailed flow of an attitude calculation process based on a detected magnetic vector.
Figure 16:
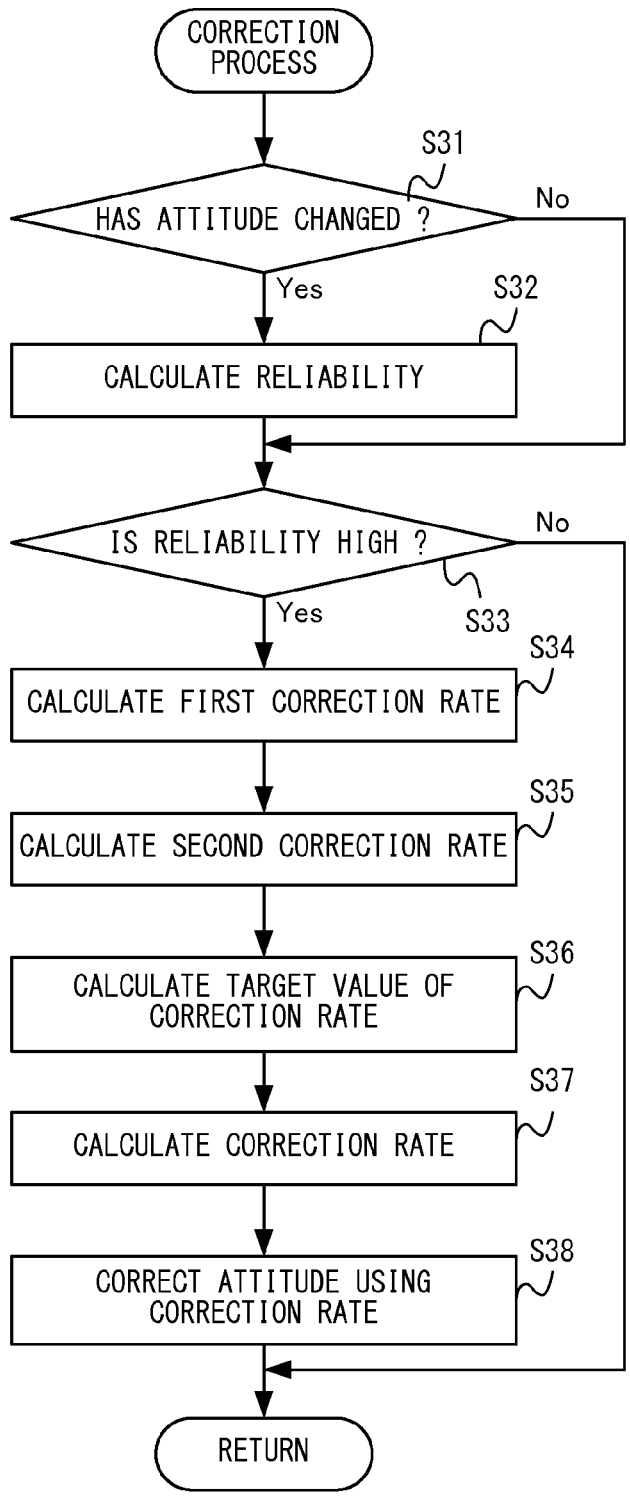
FIG. 16 is an example non-limiting flow chart showing a detailed flow of a correction process.

Note that the process in each step in the flow chart of FIGS. 14 to 16 is merely an example, and the order of steps may be changed or another process may be executed in addition to (or in place of) the process of any step, as long as similar results are obtained. While processes of the steps of the flow chart are executed by the CPU 8 in the present embodiment, one or more steps of the flow chart may be executed by a processor or a dedicated circuit other than the CPU 8.

In the present embodiment, first, in step S1, the CPU 8 obtains operation data transmitted from the input device 2. In the present embodiment, the input device 2 repeatedly transmits the operation data to the information processing device 3 at a rate of once per a predetermined amount of time. In response to this, the information processing device 3 successively receives the operation data. The information processing device 3 stores the received operation data in the operation data storage area 13 of the memory 9. Thus, operation data including the detected magnetic data 14 is obtained.

In step S2, the CPU 8 calculates the attitude of the input device 2 by the different method other than the method of using the magnetic sensor 4. In the present embodiment, the CPU 8 calculates the attitude of the input device 2 using the gyrosensor 5 and the acceleration sensor 6. As a specific process, the CPU 8 reads out the operation data from the memory 9, and calculates the attitude based on data which is included in the operation data and detected by the gyrosensor 5 and the acceleration sensor 6. Note that any method may be employed as a specific method for calculating the attitude of the input device 2 based on the angular velocity detected by the gyrosensor 5 and the acceleration detected by the acceleration sensor 6. The CPU 8 stores the data representing the calculated attitude in the memory 9 as the first attitude data.

In step S3, the CPU 8 executes the attitude calculating process based on the detected magnetic vector. The attitude calculating process based on the detected magnetic vector is a process of calculating the attitude of the input device 2 based on the detected magnetic vector. In the present embodiment, in the attitude calculating process based on the detected magnetic vector, a process is executed in which the attitude calculated in step S2 is corrected by using the detected magnetic vector. Now, referring to FIG. 15, the details of the attitude calculating process based on the detected magnetic vector will be described.

FIG. 15 is a flow chart showing an example of the detailed flow of the attitude calculating process based on the detected magnetic vector. In the attitude calculating process based on the detected magnetic vector, first, in step S11, the CPU 8 determines whether or not to execute the attitude calculating process based on the detected magnetic vector. The determination of step S11 is done based on whether it has been determined in step S12 to be described below that the attitude calculating process is to be started. If the determination result of step S11 is affirmative, the process of step S12 is executed. On the other hand, if the determination result of step S11 is negative, the CPU 8 ends the attitude calculating process based on the detected magnetic vector.

In step S12, the CPU 8 determines whether or not to start the attitude calculating process. In the present embodiment, the determination of step S12 is done based on whether a user has performed a predetermined operation. That is, the CPU 8 refers to the operation data stored in the memory 9 to determine whether a predetermined operation has been performed on the operation unit 7 of the input device 2. If the determination result of step S12 is affirmative, the process of step S13 is executed. On the other hand, if the determination result of step S12 is negative, the process of step S15 to be described below is executed. Note that if the current execution of the predetermined operation is the second or later execution since the start of the information process shown in FIG. 14, the CPU 8 may execute the process of step S15, ignoring the predetermined operation. Alternatively, in such a case, the CPU 8 may execute the process of step S12 (i.e., reset the attitude calculating process).

In step S13, the CPU 8 stores the reference magnetic vector. That is, the CPU 8 stores the latest detected magnetic vector obtained as the reference magnetic vector. As a specific process, the CPU 8 reads out the detected magnetic data 14 stored in the operation data storage area 13 of the memory 9, and stores it in the memory as the reference magnetic data 18.

In step S14, the CPU 8 executes an initialization process. The initialization process is a process of initializing various information (data) used in the attitude calculating process. In the present embodiment, the CPU 8 executes the following processes. That is, the CPU 8 empties the buffer (the buffer area 27) for storing detected magnetic vectors. The reference position (the center position) is set based on the reference magnetic vector. Herein, the end point position of the reference magnetic vector is set as the reference position. The CPU 8 stores data representing the end point position in the memory 9 as the center position data 20. The recorded range, the average radius, and the degree of correction are each set to 0. The CPU 8 stores data representing 0 in the memory 9, as the average radius data 19, the recorded range data 21, and the degree of correction data 26. The process stage in the attitude calculating process is set to the first stage. Herein, the process stage in the attitude calculating process is divided into the first stage which is until the initial center position is set, and the second stage which is after the initial center position is set. The first stage is a stage in which the attitude cannot be calculated based on detected magnetic vectors. The second stage is a stage in which the attitude can be calculated based on detected magnetic vectors.

In step S14, the CPU 8 stores the current attitude (the first attitude data 16) calculated by using the different method in the memory 9 as the reference attitude. This reference attitude is used when the attitude calculated by using the different method is corrected by using the detected magnetic vector in the correction process (step S25) to be described later.

After step S14 described above, the CPU 8 ends the attitude calculating process based on the detected magnetic vector. Thereafter, in the next and subsequent iterations of the process loop of steps S1 to S5, the processes of step S15 and subsequent steps are executed for the process of step S3.

In step S15, the CPU 8 obtains a detected magnetic vector. That is, the CPU 8 reads out a detected magnetic data stored in the operation data storage area of the memory 9. Note that in other embodiments, the CPU 8 may obtain operation data (the detected magnetic data) from the input device 2 at the time of step S15.

In step S16, the CPU 8 calculates a direction vector. The direction vector is calculated based on the reference position (the center position) and the newly-obtained detected magnetic vector. For example, the direction vector is calculated by subtracting, from the newly-obtained detected magnetic vector, a vector extending from the start point of the detected magnetic vector (the origin) to the reference position. As a specific process, the CPU 8 reads out the center position data 20 from the memory 9, and calculates the direction vector based on the detected magnetic vector obtained in step S15 and the center position data 20. The CPU 8 stores data representing the calculated direction vector in the memory 9 as the direction vector data 22.

In step S17, the CPU 8 stores the newly-obtained detected magnetic vector in the buffer. That is, the CPU 8 reads out the direction vector data 22 and classification vectors from the memory 9, and selects a classification vector whose direction is closest to the direction vector based on the direction vector and the classification vectors. Then, the detected magnetic vector (the detected magnetic data read out in step S15) is stored in one of the areas in the buffer that corresponds to the selected classification vector. Note that the selection of a classification vector is performed, for example, by a method described above in "(3-5: Method for storing detected magnetic vectors)".

In step S18, the CPU 8 calculates the average radius based on a plurality of detected magnetic vectors stored in the buffer. That is, the CPU 8 reads out the detected magnetic data stored in the buffer area 27 and the center position data 20 from the memory 9, and calculates the average radius based on the detected magnetic vectors and the center position (the reference position). Note that the average radius can be calculated as the average between the distances (the radii) from the center position to the end points of the detected magnetic vectors. The CPU 8 stores data representing the calculated average radius in the memory 9 as the average radius data 19. Note that in the present embodiment, the CPU 8 stores data representing the radii in the memory 9 because the radii are used in the process of step S32 to be described later.

In step S19, the CPU 8 updates the center position (the reference position). The update of the center position (the reference position) is performed based on the detected magnetic vectors used for the calculation of the center position (the reference position), the center position (the reference position) before the update, and the average radius. Note that as a specific method for updating the center position (the reference position), the method (see FIG. 5) described above in "(3-3: Second process)" is used, for example. As a specific process, the CPU 8 reads out the detected magnetic data stored in the buffer area 27, the center position data 20, the average radius data 19 from the memory 9, and calculates the updated center position based on these data. The CPU 8 stores data representing the calculated center position in the memory 9 as new center position data 20. Note that in the present embodiment, the CPU 8 keeps data representing the center position before the update stored in the memory 9 because the center position before the update is used in the process of step S32 to be described later.

Note that the information processing device 3 may execute the process of step S18 and the process of step S19 in parallel. For example, the CPU 8 first reads out the center position data 20 and the average radius data 19. Then, the CPU 8 executes a series of processes including the process of reading out one detected magnetic vector from the buffer area 27, the process of accumulating the radius corresponding to the detected magnetic vector, and the process of moving the center position along the radius direction corresponding to the detected magnetic vector (see FIG. 5). The CPU 8 executes the series of processes for each detected magnetic vector stored in the buffer area 27 (each time a detected magnetic vector is read out). Finally, the CPU 8 calculates the average radius using the radius values which have been accumulated. The calculated average radius will be used in the next iteration of the process loop. Note that in other embodiments, the CPU 8 may calculate the average radius each time the center position is moved. The CPU 8 may execute the processes of steps S18 and S19 by using the above processes.

In step S20, the CPU 8 determines whether the process stage is the first stage. In step S24 to be described later, it is determined that the process stage is the first stage before the process stage is set to the second stage. If the determination result of step S20 is affirmative, the process of step S21 is executed. On the other hand, the determination result of step S20 is negative, the process of step S25 to be described below is executed.

In step S21, the CPU 8 calculates the recorded range. While the recorded range may be calculated in any manner, a rectangular parallelepiped recorded range, for example, may be calculated based on the current recorded range (the recorded range data 21) and a newly-obtained detected magnetic vector (the detected magnetic vector obtained in step S15). That is, when the end point of the newly-obtained detected magnetic vector is outside the current recorded range, the CPU 8 updates one face of the recorded range so that the recorded range includes the end point therein. If the end point is inside the current recorded range, the recorded range is not updated. As a specific process, the CPU 8 reads out the recorded range data 21 from the memory 9, and calculates the recorded range based on the detected magnetic data obtained in step S15 and the recorded range data 21. Then, data representing the calculated recorded range is stored in the memory 9 as the recorded range data 21.

In step S22, the CPU 8 determines whether the recorded range is larger than a predetermined reference. This determination is done based on, for example, whether any of the edges of the rectangular parallelepiped, which is the recorded range, is longer than a predetermined threshold value (representing a predetermined length). As a specific process, the CPU 8 reads out the recorded range data 21 and data representing the threshold value from the memory 9 to make the determination described above. If the determination result of step S22 is affirmative, the process of step S23 is executed. On the other hand, if the determination result of step S22 is negative, the CPU 8 ends the attitude calculating process based on the detected magnetic vector. In this case, in the next iteration of the process loop, the processes of steps S11, S12 and S15 to S22 are executed. Then, for the attitude calculating process of step S3, the processes of step S11, S12 and S15 to S22 are executed until the determination result of step S22 is affirmative.

In step S23, the CPU 8 calculates the initial center position. The initial center position is calculated based on the reference magnetic vector and the recorded range, for example. As a specific method for calculating the initial center position, the method (see FIG. 3) described above in "(3-2: First process)" is used, for example. As a specific process, the CPU 8 reads out the reference magnetic data 18 and the recorded range data 21 from the memory 9 to calculate the initial center position based on these data. Data representing the calculated initial center position is stored in the memory 9 as new center position data 20. Thus, the center position data 20 represents the center position (and the reference position).

In step S24, the CPU 8 sets the process stage to the second stage. After step S24, the CPU 8 ends the attitude calculating process based on the detected magnetic vector. As a result of the process of step S24, the process of step S25 is executed following step S20 for the process of step S3 in the next iteration of the process loop.

In step S25, the CPU 8 executes a correction process. The correction process is a process of correcting the attitude of the input device 2, which has been calculated by the different method described above, by using a direction vector. Now, referring to FIG. 16, the details of the correction process will be described.

FIG. 16 is an example non-limiting flow chart showing a detailed flow of the correction process. In the correction process, first, in step S31, the CPU 8 determines whether the attitude of the input device 2 has changed by an amount greater than a predetermined reference. The determination of step S31 is done based on whether the amount of change of the attitude of the input device 2 is greater than or equal to a predetermined amount, for example. In the present embodiment, this determination is made by using the buffer described above. That is, the CPU 8 determines whether the newly-obtained detected magnetic vector has been classified into a category different from that of the previously-obtained detected magnetic vector. Note that this determination may be made in any manner. For example, in other embodiments, this determination may be made by using an attitude calculated by the different method. If the determination result of step S31 is affirmative, the process of step S32 is executed. On the other hand, if the determination result of step S31 is negative, the process of step S33 is executed, skipping the process of step S32.

In step S32, the CPU 8 calculates the reliability. In the present embodiment, the reliability is calculated based on the amount of movement of the center position before and after the update, and the dispersion between the lengths of the radii corresponding to the detected magnetic vectors. As a specific method for calculating the reliability, the method described above in "(Determination on whether or not to calculate attitude)" is used, for example. As a specific process, the CPU 8 reads out, from the memory 9, the data representing the center position before the update and the center position after the update stored in step S19, and the data representing the radii stored in step S18, to calculate the reliability using these data. Data representing the calculated reliability is stored in the memory 9 as the reliability data 23.

In the step S33, CPU 8 determines whether the reliability is greater than a predetermined reference. This determination is made based on whether the reliability is greater than a threshold value, for example. As a specific process, the CPU 8 reads out the reliability data 23 and the data representing the threshold value from the memory 9 to make the determination. If the determination result of step S33 is affirmative, the process of step S34 is executed. On the other hand, if the determination result of step S33 is negative, the CPU 8 ends the correction process.

In step S34, the CPU 8 calculates the first correction rate. In the present embodiment, the first correction rate is calculated based on the difference between the radius from the center position to the end point position of the new detected magnetic vector and the radius corresponding to the reference magnetic vector (this may be the average radius described above). As a specific method for calculating the first correction rate, the method described above in "(First correction rate)" may be used, for example. As a specific process, the CPU 8 reads out the reference magnetic data 18 and the center position data 20, and calculates the first correction rate using the data read out and the detected magnetic data 14 obtained in step S15. The CPU 8 stores data representing the calculated first correction rate in the memory 9 as the first correction rate data 24.

In step S35, the CPU 8 calculates the second correction rate. In the present embodiment, the second correction rate is set based on the difference between the direction of the direction vector corresponding to the newly-obtained detected magnetic vector and the direction of the direction vector corresponding to the reference magnetic vector. As a specific method for calculating the second correction rate, the method described above in "(Second correction rate)" may be used, for example. As a specific process, the CPU 8 reads out the direction vector data 22, the reference magnetic data 18 and the center position data 20, and calculates the second correction rate using the data read out. The CPU 8 stores data representing the calculated second correction rate in the memory 9 as the second correction rate data 25.

In step S36, the CPU 8 calculates the target value of the degree of correction. In the present embodiment, the target value of the degree of correction is calculated based on the first correction rate and the second correction rate. Specifically, the target value of the degree of correction is calculated by multiplying together the first correction rate and the second correction rate, and further multiplying the product by a predetermined coefficient. As a specific process, the CPU 8 reads out the first correction rate data 24, the second correction rate data 25 and data representing the predetermined coefficient from the memory 9, and calculates the target value of the degree of correction using the data read out. The CPU 8 stores data representing the calculated target value in the memory 9.

In step S37, the CPU 8 calculates the degree of correction. In the present embodiment, the degree of correction is calculated based on the target value of the degree of correction. Specifically, when the target value is greater than the current degree of correction (when increasing the degree of correction), the CPU 8 calculates a new degree of correction by bringing the current degree of correction closer to the target value by a predetermined rate. Then, it is possible to prevent a rapid increase of the degree of correction, and to prevent the calculated attitude of the input device 2 from rapidly changing due to the rapid increase of the degree of correction. On the other hand, when the target value is smaller than the current degree of correction (when decreasing the degree of correction), the CPU 8 uses the target value as the new degree of correction. Note that when the degree of correction is decreased, the attitude of the input device 2 does not change rapidly even if the degree of correction changes rapidly. Therefore, it is not necessary to avoid a rapid change of the degree of correction. As a specific process, the CPU 8 reads out the degree of correction data 26 and data representing the target value from the memory 9, and calculates the new degree of correction using the data read out. The CPU 8 stores data representing the calculated degree of correction in the memory 9 as the degree of correction data 26.

In step S38, the CPU 8 corrects the attitude using the direction vector. That is, the attitude calculated by the different method is corrected based on the direction vector corresponding to the latest detected magnetic vector. As the correction method in step S38, the method described above in "(Correction of attitude by different method)" and "(Calculation of degree of correction)" may be used, for example. As a specific process, the CPU 8 reads out the first attitude data 16, the direction vector data 22 and the degree of correction data 26 from the memory 9, and calculates the corrected attitude using the data read out. The CPU 8 stores data representing the calculated attitude in the memory 9 as the second attitude data 17. Thus, the attitude of the input device 2 is calculated based on detected magnetic vectors.

After step S38, the CPU 8 ends the correction process (step S25) shown in FIG. 16. After step S25, the CPU 8 ends the attitude calculating process based on the detected magnetic vector (step S3) shown in FIG. 15.

In step S4 shown in FIG. 14, the CPU 8 executes the information process based on the attitude of the input device 2. The information process is executed using the attitude calculated in step S3 as an input. For example, the CPU 8 displays, on the display device, an image obtained as a result of the information process based on the attitude.

In step S5, the CPU 8 determines whether or not to end the information process. This determination may be made in any manner, and is made based on whether a predetermined instruction to end has been given by the user, for example. If the determination result of step S5 is negative, the process of step S1 is executed again. On the other hand, if the determination result of step S5 is affirmative, the CPU 8 ends the information process shown in FIG. 14. Thereafter, the series of processes of steps S1 to S5 is repeated until it is determined in step S5 that the information process is to be ended. The information process shown in FIG. 14 is as described above.

[5. Other Embodiments]

The embodiment above is directed to an example where a magnetic sensor is used as a sensor for detecting a value that varies depending on the attitude of the input device. Herein, in other embodiments, the sensor for detecting a value that varies depending on the attitude of the input device may be any other sensor. The attitude calculating process of the present embodiment is advantageous when a detected vector obtained from the sensor for detecting a value that varies depending on the attitude of the input device contains a component that is not dependent on the attitude of the input device and a component that is dependent on the attitude of the input device. That is, the information processing device 3 may be a device that obtains detected vectors, estimates the center position of a spherical body having a curved surface estimated by the end point positions of the detected vectors, and calculates the attitude of the input device based on a direction vector representing a direction from the center position to the end point position of a detected vector.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

As described above, the present embodiment is applicable to, for example, a game system, a game program, etc., with which an input device is used for game operations, with the aim of precisely calculating the attitude of the input device.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium storing an information processing program to be executed by a computer of an information processing device for calculating an attitude of an input unit having a magnetic sensor that is structurally part of or related to the input unit, the information processing program configuring the computer to execute:
repeatedly obtaining detected magnetic vectors detected by the magnetic sensor;
repeatedly estimating a center position of a spherical body having a curved surface which is estimated based on end point positions of the obtained detected magnetic vectors; and
calculating the attitude of the input unit based on a direction vector representing a direction from the estimated center position to the end point positions of the detected magnetic vectors,
wherein each time a detected magnetic vector is obtained, the center position is updated so that at least some of lengths from the center position to end points of the detected magnetic vectors used for the estimation of the center position are brought closer to an average between the lengths.

2. The storage medium according to claim 1, wherein the information processing program further configures the computer to calculate the attitude while relatively decreasing an influence of a newly-obtained detected magnetic vector as an amount of change of the center position before and after an update is larger.

3. The storage medium according to claim 1, wherein the information processing program further configures the computer to calculate attitude while relatively decreasing an influence of a newly-obtained detected magnetic vector as dispersion between lengths from a current center position to the end point positions of the detected magnetic vectors used for the estimation of the center position is larger.

4. The storage medium according to claim 1, wherein in response to a predetermined condition satisfied by the detected magnetic vectors, the center position is estimated based on the detected magnetic vectors.

5. The storage medium according to claim 4, wherein the predetermined condition is that an area that includes therein the end point positions of the detected magnetic vectors has become larger than a predetermined size.

6. The storage medium according to claim 4, wherein the predetermined condition is that directions of the detected magnetic vectors have been spread wider than a predetermined range.

7. The storage medium according to claim 4, wherein the information processing program further configures the computer to, in response to the predetermined condition, set an initial center position at a position on an inner side of the curved surface which is estimated based on the end point positions of the detected magnetic vectors.

8. The storage medium according to claim 4, wherein the information processing program further configures the computer to set an initial center position inside an area determined so as to include the end point positions of the detected magnetic vectors.

9. The storage medium according to claim 4, wherein the information processing program further configures the computer to set an initial center position inside a rectangular parallelepiped of a smallest size that includes the end point positions of the detected magnetic vectors.

10. The storage medium according to claim 4, wherein the information processing program further configures the computer to set an initial center position at a centroid position among the end point positions of the detected magnetic vectors.

11. The storage medium according to claim 4, wherein the information processing program further configures the computer to calculate the attitude of the input unit based on the direction vector at least on a condition that the predetermined condition is satisfied.

12. An information processing device for calculating an attitude of an input unit having a magnetic sensor structurally part of or related to the input unit, comprising:
  an obtaining unit for repeatedly obtaining detected magnetic vectors detected by the magnetic sensor;
  a center estimation unit for estimating a center position of a spherical body having a curved surface which is estimated based on end point positions of the detected magnetic vectors; and
  an attitude calculation unit for calculating the attitude of the input unit based on a direction vector representing a direction from the center position to the end point position of the detected magnetic vector,
  wherein each time a detected magnetic vector is obtained, the center estimation unit updates the center position so that at least some of lengths from the center position to end points of the detected magnetic vectors used for the estimation of the center position are brought closer to an average between the lengths.

13. An information processing system for calculating an attitude of an input unit having a magnetic sensor that is structurally part of or related to the input unit, comprising:
  an input circuit configured to repeatedly obtain detected magnetic vectors detected by the magnetic sensor;
  a center position calculator configured to estimate a center position of a spherical body having a curved surface which is estimated based on end point positions of the detected magnetic vectors; and
  an attitude calculator configured to calculate the attitude of the input unit based on a direction vector representing a direction from the center position to the end point positions of the detected magnetic vectors,
  wherein each time a detected magnetic vector is obtained, the center position calculator updates the center position so that at least some of lengths from the center position to end points of the detected magnetic vectors used for the estimation of the center position are brought closer to an average between the lengths.

14. An attitude calculation method for calculating an attitude of an input unit having a magnetic sensor that is structurally part of or related to the input unit, comprising:
  repeatedly obtaining detected magnetic vectors detected by the magnetic sensor;
  estimating a center position of a spherical body having a curved surface which is estimated based on end point positions of the detected magnetic vectors; and
  calculating the attitude of the input unit based on a direction vector representing a direction from the center position to the end point positions of the detected magnetic vectors,
  wherein each time a detected magnetic vector is obtained, the center position is updated so that at least some of lengths from the center position to end points of the detected magnetic vectors used for the estimation of the center position are brought closer to an average between the lengths.

* * * * *